United States Patent
Mohan et al.

(10) Patent No.: US 11,822,962 B2
(45) Date of Patent: Nov. 21, 2023

(54) TECHNIQUES FOR EXECUTION ORCHESTRATION WITH TOPOLOGICAL DEPENDENCY RELATIONSHIPS

(71) Applicant: Oracle International Corporation, Redwood Shores, CA (US)

(72) Inventors: Abishek Murali Mohan, Kirkland, WA (US); Alaa Shaker, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 529 days.

(21) Appl. No.: 17/177,915

(22) Filed: Feb. 17, 2021

(65) Prior Publication Data
US 2022/0188161 A1 Jun. 16, 2022

Related U.S. Application Data

(60) Provisional application No. 63/124,509, filed on Dec. 11, 2020.

(51) Int. Cl.
G06F 9/50 (2006.01)
G06F 16/23 (2019.01)

(52) U.S. Cl.
CPC ........ G06F 9/5005 (2013.01); G06F 16/2365 (2019.01)

(58) Field of Classification Search
CPC ........ G06F 9/50; G06F 9/5005; G06F 9/5011; G06F 9/5027; G06F 9/5066; G06F 9/52; G06F 9/5077
See application file for complete search history.

(56) References Cited

U.S. PATENT DOCUMENTS 8,572,618 B2   10/2013   Kand et al.
8,677,376 B2 *  3/2014   Kwan .................. G06F 8/75
                                        707/610

(Continued)

FOREIGN PATENT DOCUMENTS

CN          110333932          10/2019

OTHER PUBLICATIONS

"5 Modeling Orchestration Plans", Communications Order and Service Management Modeling Guide, Available Online at: https://docs.oracle.com/cd/E49155_01/doc.73/e49705/mdl_full_patt.htm#OSMMG680, Jul. 20, 2020, 36 pages.

(Continued)

*Primary Examiner* — Andy Ho
(74) *Attorney, Agent, or Firm* — Kilpatrick Townsend & Stockton LLP

(57) ABSTRACT

A method for managing cloud resource dependencies is described. The method may include receiving a resource configuration of a first resource. The method may include identifying a dependency of a first stage of a first resource on a second resource and performing a topological sort of a plurality of resources, based at least in part on the dependency of the first stage of the first resource. The method may include constructing a dependency graph including the plurality of resources, including the first stage of the first resource in a subordinate rank and the second resource in a superior rank, corresponding to the topological sort. The method may include generating an execution queue including the second resource in a priority execution position in the execution queue. The method may include executing the plurality of resources according to the execution queue.

20 Claims, 19 Drawing Sheets

(56) References Cited

U.S. PATENT DOCUMENTS

| | | | |
|---|---|---|---|
| 8,887,163 B2* | 11/2014 | Rastogi | G06F 9/4881 |
| | | | 718/103 |
| 8,904,345 B2 | 12/2014 | Dalal et al. | |
| 9,684,502 B2 | 6/2017 | Fu et al. | |
| 10,564,938 B2 | 2/2020 | Zhao et al. | |
| 11,500,673 B2* | 11/2022 | Taher | G06F 9/485 |
| 2009/0048896 A1 | 2/2009 | Anandan | |
| 2015/0378701 A1 | 12/2015 | Cai et al. | |
| 2019/0109756 A1 | 4/2019 | Abu Lebdeh et al. | |

OTHER PUBLICATIONS

"Depends OnAttribute", Available Online at: https://docs.aws.amazon.com/AWSCloudFormation/latest/UserGuide/aws-attribute-dependson.html, Accessed from Internet on Jul. 20, 2020, pp. 1-7.

"Resource Dependencies", Terraform-HashiCorp Learn, Available Online at: https://learn.hashicorp.com/terraform/azure/dependencies_az, Accessed from Internet on Jul. 20, 2020, pp. 1-10.

Lima, "Handling Circular Dependency Errors in AWS CloudFormation", Infrastructure & Automation, Available Online at: https://aws.amazon.com/blogs/infrastructure-and-automation/handling-circular-dependency-errors-in-aws-cloudformation/, Apr. 16, 2019, pp. 1-6.

* cited by examiner

TECHNIQUES FOR EXECUTION ORCHESTRATION WITH TOPOLOGICAL DEPENDENCY RELATIONSHIPS

CROSS-REFERENCE TO RELATED APPLICATIONS

The present application is a non-provisional application of and claims the benefit and priority under 35 U.S.C. 119(e) of U.S. Provisional Application No. 63/124,509, filed Dec. 11, 2020 entitled "TECHNIQUES FOR EXECUTION ORCHESTRATION WITH TOPOLOGICAL DEPENDENCY RELATIONSHIPS," the entire contents of which is incorporated herein by reference for all purposes.

BACKGROUND

Cloud-based platforms provide scalable and flexible computing resources for users. One example of a cloud-based platform is infrastructure as a service (IaaS), which may offer entire suites of cloud solutions around a customer's data, including a growing number of resources (compute, storage, etc.) related by complex and multiple inter-resource dependencies.

Dependencies propagate changes to resource values from higher level orders to lower level orders and introduce cyclical dependencies and redundant execution, presenting sources of significant inefficiency (as much as 5× increases in latency during front-end initialization). Defining an order of execution of resource initialization (e.g., bootstrapping), may involve manually defining (e.g., imperative coding) an order of execution for each resource included in the application.

Growing requirements and scenarios have ballooned the complexity of initialization, and potentially result in problems such as non-deterministic error handling, performance issues such as accidental serialization or multiple initialization, and circular dependencies. This may make developers responsible for understanding and manually defining inter-resource dependencies and execution order for each of the other resources included in the initialization. Such approaches may lead to shortcuts in defining dependencies that significantly slow down initialization and lead to breakdowns.

BRIEF SUMMARY

Techniques are provided (e.g., a method, a system, non-transitory computer-readable medium storing code or instructions executable by one or more processors) for generating an execution dependency graph that describes an execution queue of the resources, where the resources include multiple inter-resource dependencies.

In particular, techniques may be directed to generating an execution order from a resource configuration including a declarative dependency configuration. Instead of the user specifically defining an order of execution, dependencies may be defined as resource properties in a declarative manner. In this way, a dependency orchestrator may ascertain and/or order an application initialization to potentially reduce redundancies and error propagation in execution. In some embodiments, the dependency orchestrator (also referred to as the orchestrator, for simplicity) may automatically (e.g., without human user direction) define a single execution dependency graph for a number of inter-dependent resources in a single environment (e.g., as part of a massive single page application, such as a console application).

A method for managing cloud resource dependencies is described. The method may include receiving a resource configuration of a first resource. The method may include identifying a dependency of a first stage of a first resource on a second resource and performing a topological sort of a plurality of resources, based at least in part on the dependency of the first stage of the first resource. The method may include constructing a dependency graph including the plurality of resources, including the first stage of the first resource in a subordinate rank and the second resource in a superior rank, corresponding to the topological sort. The method may include generating an execution queue including the second resource in a priority execution position in the execution queue. The method may include executing the plurality of resources according to the execution queue.

Optionally, constructing the dependency graph may include identifying a redundant dependency in the dependency graph and removing the redundant dependency from the dependency graph. The resource configuration of the first resource may include a declarative identification of one or more resources upon which the first stage of the first resource depends, and wherein identifying the dependency of the first stage of the first resource comprises identifying the declarative identification. The method may further include receiving an event notification indicating the second resource has changed. The method may include traversing the dependency graph to identify one or more stages depending on the second resource including the first stage. The method may include adding the first stage to the execution queue according to the dependency graph. The method may further include receiving an error notification describing an error in execution of the second resource. The method may include traversing the dependency graph to identify a dependent stage depending on the second resource. The method may include identifying the first stage as the dependent stage. The method may include modifying a resource status of the first stage to an error status. The method may include initializing the first resource and the second resource, in accordance with the topological sort. The plurality of resources may be included in a single environment.

In certain embodiments, a computer system includes one or more processors and a memory in communication with the one or more processors, the memory configured to store computer-executable instructions, wherein executing the computer-executable instructions causes the one or more processors to perform one or more of the steps of the method described above.

In certain embodiments, a computer-readable storage medium stores computer-executable instructions that, when executed, cause one or more processors of a computer system to perform one or more steps of the method described above.

DETAILED DESCRIPTION

Figure 1:
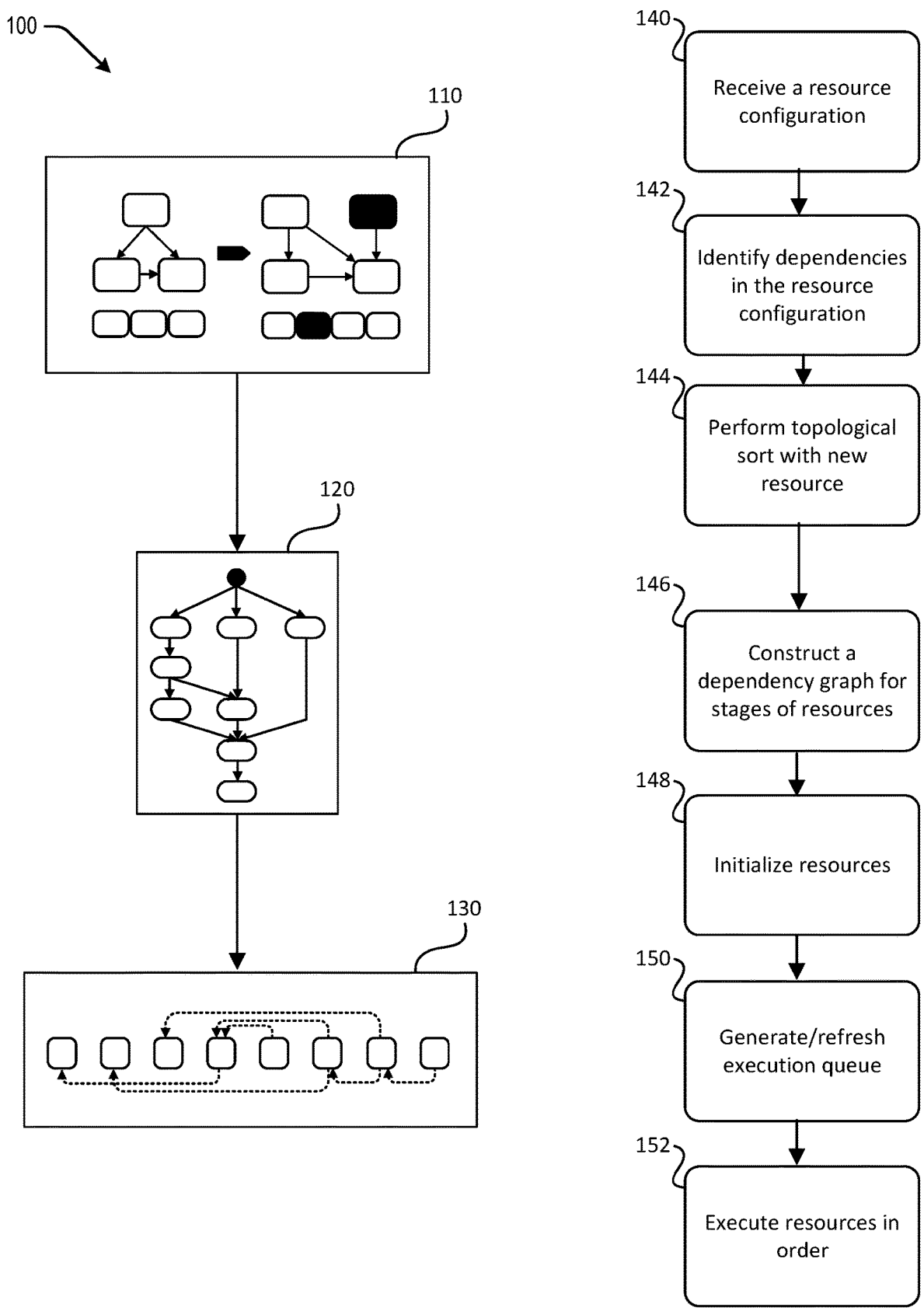
FIG. 1 illustrates an example system for orchestrating execution of interdependent cloud resources, in accordance with one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Cloud-based platforms provide scalable and flexible computing resources for users. Computing resources may include distributed storage, processor resources, or other distributed computing resources provided as part of cloud services. Such cloud-based platforms, also referred to as infrastructure as a service (IaaS) may offer entire suites of cloud solutions around a customer's data, for example solutions for authoring transformations, loading data, and presenting the data. A user of the cloud-based platform may access cloud resources through a massive single page application (e.g., a single console application), which may incorporate a plurality of resources in a single application. An application initialization client (also referred to as an orchestrator for simplicity) may receive a plurality of resource dependencies describing relationships between the plurality of resources.

The resource dependencies may describe a condition whereby a resource will re-execute in response to a change in a resource upon which it depends (e.g., it receives a value from another resource as an input). The resource dependencies can be defined for each stage of each resource, where a stage may be the smallest subunit of the execution order for a resource. Each stage can define dependencies on other stages and/or resources. A trigger can be attached to any resource or stage to force execution of the stage and it's descendants. The orchestrator may initialize each resource it manages. The orchestrator may generate an execution dependency tree that can describe an execution queue of the resources. The orchestrator can add each stage in the tree in level-order to the execution queue (where level order may describe a dependency rank in a topological sort or according to a dependency graph). When the orchestrator receives a notification of a resource update event affecting a resource in the tree, it may traverse the execution dependency tree to find all dependent stages that may be re-executed and can add them to the execution queue. If a stage returns an error, the orchestrator can also move all resources depending on the stage into an error state and the orchestrator may continue to execute other paths in the execution dependency tree. Stages and/or resources can also be configured to be promoted, demoted, or omitted from the execution queue, for example, by priority configuration, which can cause the orchestrator to return an error or to skip re-execution of a stage or resource. The orchestrator may execute a stage or resource marked demoted or omitted if it is depended upon by a promoted stage. In some embodiments, stages may be configured by a priority. In this way, where two stages have the same level order traversal, the priority value may decide the execution order.

In some embodiments, the orchestrator may provide advantages and potential improvements over the current state of the art. For example, reduced latency, improved error handling, progressive rendering of a single environment (e.g., a console application) may be provided by the orchestrator, at least in part by processing declarative configurations of dependencies between resources. Developers will have access to a framework for adding new resources declaratively with low cognitive overhead, for example, by declaring resource dependencies on a proximate superior level, rather than an exhaustive description of all superior resources. The orchestrator may improve efficiency and performance of application initialization and progressive rendering by automatically (e.g., without user intervention) managing resource loading sequence, error handling, and/or dependencies. For example, the orchestrator may reduce the conventional practice of short-cutting the initialization process as an approach to avoid imperative declaration of distant dependency relationships. In turn, this may provide improved debug performance, which could potentially be implemented by the orchestrator itself, for example, by detecting cyclic dependencies and redundant dependencies automatically. Furthermore, the orchestrator may provide improved flexibility around adding new resources and may reduce risk of breaking dependent resources with unforeseeable dependency relationships to the added resource.

Finally, the orchestrator may manage the execution of resources dynamically, and may improve the robustness of the environment, for example, by re-executing dependent resources in response to an update to a resource or by moving dependent resources into an error state to potentially avoid cascade failures of the dependent resources.

FIG. 1 illustrates an example system 100 for orchestrating execution of interdependent cloud resources, in accordance with one or more embodiments. In some embodiments, a cloud resource may include (e.g., as part of a resource configuration) one or more dependencies on other cloud resources, as described in more detail in an illustrative example in FIG. 3, below. The dependencies may cause the cloud resource to reinitialize and/or re-execute in response to a change and/or an update in a resource upon which it depends. For example, when a cloud resource receives user input or changes its state, another cloud resource that receives a value from the resource may also be updated to reflect the change. Managing such dependencies for large numbers of cloud resources manually may present a challenge to human users, and may result in inefficient execution orders, for example, including categorical await commands that may increase system latency by as much as an order of magnitude or more.

In some embodiments, the system 100 may include an automated resource dependency management approach including one or more operations, using resource dependency information included as part of a resource configuration. For example, the system 100 may include an implementation of an orchestrator (e.g., an application initialization client), which may identify one or more cloud resource dependencies 110. In so doing, the orchestrator may receive a resource configuration (e.g., operation 140). Receiving the resource configuration may form a part of configuring an application that accesses or otherwise implements multiple cloud resources. As an illustrative example, a massive single page application, such as a console application, may implement multiple cloud resources in a single user interface, as described in more detail in reference to FIG. 3, below. The cloud resources may be dependent on the state of one or more other cloud resources also implemented in the massive single page application. In some embodiments, configuring the massive single page application may include configuring the constituent cloud resources using information included in the resource configuration for each cloud resource.

The resource configuration may describe one or more cloud resource parameters, and may include resource dependency information. In some embodiments, the resource dependency information may be a declarative description of resource dependencies of the cloud resource on one or more other cloud resources. In contrast to imperative descriptions of dependency information, a declarative approach may include a primary dependency, but not secondary dependencies or other more distant dependencies. In an example embodiment, a first resource depends on a second resource, which in turn depends on a third resource, a declarative description of the first resource received as part of the operation 140 may describe that the first resource depends on the second resource, but may omit information describing the dependency of the second resource on the third resource. In this way, the declarative description may reduce the complexity of configuring the cloud resources.

The orchestrator may identify dependencies in the resource configuration (e.g., operation 142). In some embodiments, the system 100 may include storing dependency information in a data store, processing the resource configurations to extract dependency information and/or transform the dependency information from a first format to a second format (e.g., a format compatible with subsequent operations of the system 100). In some embodiments, as described in more detail in reference to FIG. 8, below, dependency information identified through the operation 142 may indicate a resource not previously included in an existing execution order (e.g., a resource configuration may include a dependency upon two resources, of which one is a newly added resource). In some cases, the resource not previously included in the existing execution order may be a newly added resource (e.g., a resource that has been newly created or implemented), such that the resource configuration of a dependent resource may have been updated. For example, operation 140 may include receiving an updated resource configuration of the dependent resource.

Subsequent to operation 142, the system 100 may include generating and/or performing a topological sort including the dependencies identified in operation 142. In some embodiments, the topological sort may include a new resource, as when the resource configuration received in operation 140 is a new resource configuration. In some embodiments, the topological sort may include a resource that had been previously included with the cloud resources, as when the dependency of the resource has been updated (e.g., when the resources included have been modified). As an illustrative example, the orchestrator may implement a topological sort of the identified resource dependencies by sorting (e.g., visualized as a left to right sequence) the cloud resources in order of increasing dependency, where a primary resource may be identified as having one or more secondary resources depending on the value of the primary resource, with one or more tertiary resources depending on the values of the one or more secondary resources, etc. As described in more detail in reference to FIG. 8, below, in some cases, the cloud resources may include multiple primary resource (e.g., resources that do not depend on a higher-order resource). In such cases, the orchestrator may implement operation 144 such that primary resources are grouped in the topological sort, followed by secondary resources, followed by tertiary resources, etc., as an approach to implementing a level order categorization (also referred to as a rank) that may differ from an execution order, as described in more detail in reference to FIG. 10, below.

Subsequent to operation 144, the system 100 may include one or more operations for generating a dependency graph 120 (e.g., operation 146). The dependency graph 120, as described in more detail in reference to FIG. 9, below, may describe dependency information including, but not limited to resource-level dependencies and/or individual stage dependencies. In some embodiments, a stage may describe a discrete operation of a resource that may be individually configured in a manner different from other stages of the same resource, as described in more detail in reference to FIG. 4, below. In some embodiments, operation 146 may include defining one or more level orders, corresponding to the level orders described in reference to the topological sort of operation 144. For example, the orchestrator may assign primary resources to a first level order (e.g., a superior rank), secondary resources to a second level order (e.g., a subordinate rank), etc. In this way, the dependency graph 120 may describe multiple interdependencies amongst multiple cloud resources and/or cloud resource stages. Advantageously, in some embodiments, the system 100 may include one or more optional operations permitting the dependency graph to be exported into one or more visual formats (e.g., as an image, a vector-graphic, etc.) and/or data formats, which may permit a user of the system 100 to visualize and distribute the resource dependencies to resource coordinators and/or development teams. Such visualization may facilitate improved debugging and error minimization.

Subsequent to operation 148, the system 100 may include initializing the cloud resources. As described in more detail in reference to FIG. 6, below, initializing may be a state of the cloud resource that is one of a number of possible resource states. In some cases, initializing may constitute a preliminary operation that provides initial values or states to be provided to resources (e.g., according to the resource dependencies 110 and/or the dependency graph 120), to permit them to initialize. As an illustrative example, initialization may proceed according to the topological sort, such that primary resources may be initialized before secondary resources, etc. The initial states and/or values of the primary resources may be provided to the secondary resources at initialization of the secondary resources. In this way, cloud resources may be provided with the resource states and/or values upon which they depend at the time of initialization. In contrast to an execution queue, initialization described in reference to operation 148 may be coordinated by the orchestrator in a relatively simpler approach, by which the orchestrator may not include detailed inter-resource or interstage dependency information. For example, when initializing the resources (e.g., after recovering from a failure, error, and/or other service disruption) the entire dependency graph 120 may be initialized. In such cases, initializing resources according to level order information may potentially avoid a dependency error.

Subsequent to operation 148, the system 100 may include generating and/or refreshing an execution queue 130 (e.g., operation 150). In some embodiments, the execution queue 130 may include cloud resources and/or resource stages according to a sequence based at least in part on the dependencies 110, as organized in the dependency graph 120. While the topological sort performed in operation 144 may describe a level order of the resources later included in the execution queue 130, operation 150 may incorporate additional information, including, but not limited to, await commands, considerations arising out of parallel processing implementations, ordering different resources executing using the same cloud infrastructure (e.g., deconfliction), or resource priority information.

In some embodiments, therefore, the execution queue 130 may include two different stages of the same resource in non-consecutive execution positions, for example, when the two different stages depend on different higher order resources, or, in another example, when the two different stages use the same cloud infrastructure to execute. Advantageously, generating the execution queue 130 in this way may permit the orchestrator to potentially reduce latency when propagating changes through the dependency graph 120. For example, the execution queue 130 may take into account parallelization in such a way that multiple resources may be executed and/or re-executed in a relatively reduced period of time, as compared to serial execution according simply to level order (e.g., as identified by operation 144).

Subsequent to operation 150, the system may include executing the cloud resources in order, according to the execution queue (e.g., operation 152). In some embodiments, the orchestrator may execute the cloud resources as part of an initialization and/or re-initialization of a single environment (e.g., as part of a massive single page application, such as a console application). In some embodiments, the orchestrator may execute cloud resources in response to receiving a notification of a resource state change and/or an update to a resource state and/or value of one or more of the cloud resources included in the dependency graph 120, as described in more detail in reference to FIG. 2, below.

Figure 2:
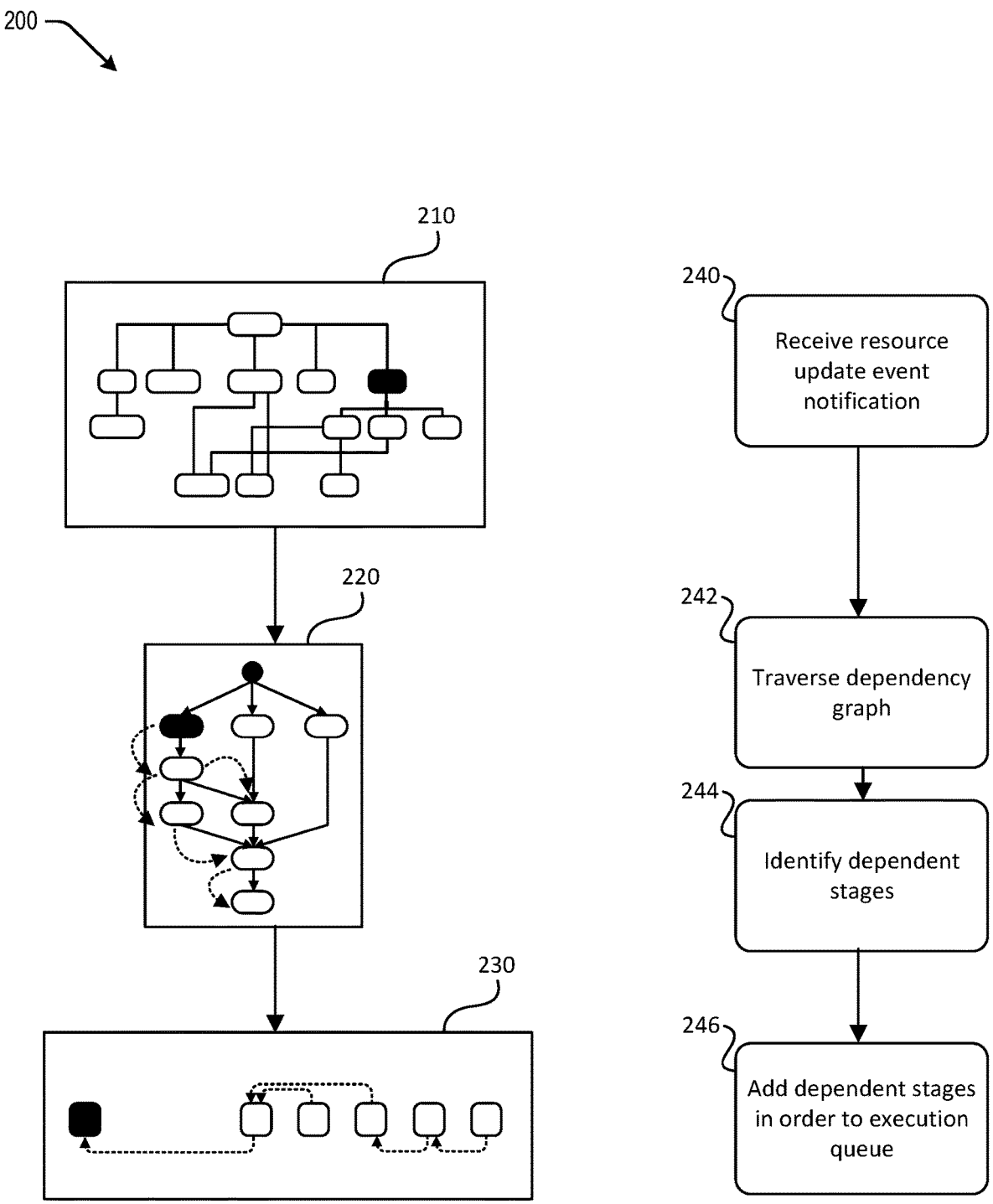
FIG. 2 illustrates an example system for propagating updates to dependent cloud resources, in accordance with one or more embodiments.
Figure 3:
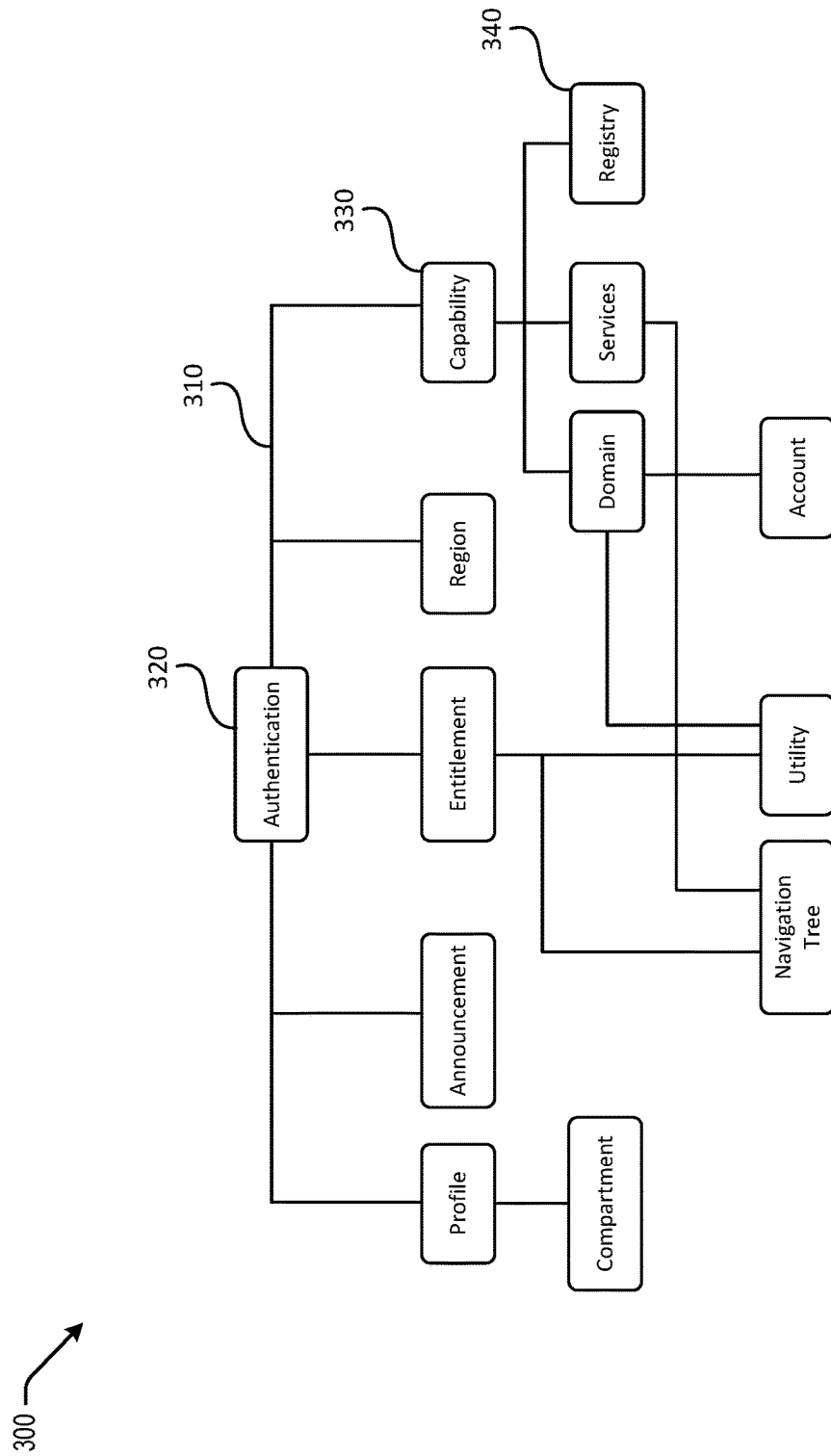
FIG. 3 is a block diagram illustrating an example of a dependency tree including multiple cloud resources, in accordance with one or more embodiments.

FIG. 2 illustrates an example system 200 for propagating updates to dependent cloud resources, in accordance with one or more embodiments. Similarly to the example system 100, the example system 200 may describe embodiments where a cloud resource included in a resource dependency tree 210 may undergo a state change and/or an update event. As described above, the orchestrator may generate a dependency graph 220 (e.g., dependency graph 120 of FIG. 1) and an execution queue 230 (e.g., execution queue 130 of FIG. 1), by which the orchestrator may execute and/or re-execute one or more cloud resources (e.g., resources providing information to a single environment, such as a console application). The diagrams included in FIGS. 1-3 are intended as exemplary illustrations of data structures, and are not intended to describe a specific organization of data.

In some embodiments, the orchestrator may be configured to receive notifications of event status changes and or update events undergone by cloud resources managed by the orchestrator (e.g., operation 240). For example, the orchestrator may subscribe to a notifier service of the cloud system of which the orchestrator is a part, where the notifier service may be configured to provide notifications to the orchestrator. In this way, the orchestrator may be triggered to propagate changes when a cloud resource constituent in the resource dependency tree 210 undergoes an update event or changes its status or its value (e.g., an error occurs, a user input changes the resource status, a value of the resource changes, etc.).

Subsequent to operation 240, the orchestrator may traverse the dependency graph 220, which may be an example of the dependency graph 120 of FIG. 1, above (e.g., operation 242). In some embodiments, traversing the dependency graph 220 may describe one or more operations, executed by the orchestrator, to potentially limit update operations to those resources included in the dependency tree 210 that depend on the resource, subject, for example, to an update event, that was identified in the notification received in operation 240. Traversing may describe one or more logical operations by which the orchestrator may generate and or append a cloud resource or a stage of a cloud resource, present in the dependency graph 220, to a list and/or table containing resources and/or resource stages affected by changes described in operation 240. In some embodiments, the orchestrator may start from the resource identified in the notification, and follow all dependency relationships to the lower level order of the dependency graph 220.

The orchestrator may continue traversing the dependency graph 220 by following subsequent dependency relationships until the lowest level order of the dependency graph 220 has been reached for which the constituent resources and/or resource stages have dependent resources and/or resource stages. In some embodiments, operation 242 may include the orchestrator traversing the entire dependency graph 220, for example, as an approach to refreshing, updating, and or constructing the dependency graph (e.g., operation 146 of FIG. 1), for example, when the notification received in operation 240 includes a change to a dependency configuration of one or more resources and/or resource stages in the dependency tree 210.

In some embodiments, the system 200 may include one or more operations by which the orchestrator may identify the dependent stages (e.g., operation 244). In some embodiments, the operation 242 may permit the orchestrator to identify one or more resources and/or stages of resources (e.g., resources in a subordinate rank) that depend on the resource identified in operation 240. For example, traversing the dependency graph 220 may permit the orchestrator to identify the dependent resources and/or resource stages directly. In some cases, as when traversing the entire dependency graph 220, the orchestrator may identify dependent resources and/or resource stages from tabulated and/or collected dependency information (e.g., following an additional topological sort of the collected dependency information).

Subsequent to operation 244, the orchestrator may add dependent stages to an execution queue 230 as one approach to propagating changes down the dependency graph 220. In some embodiments, the execution queue 230 may be or include the resources and/or resource stages included in an existing execution queue (e.g., execution queue 130 of FIG. 1), which may have been generated, for example, as part of an initialization process or a re-initialization process. As with operation 150 of FIG. 1, the orchestrator may add dependent resources and/or resource stages according to level order (e.g., rank) as well as other factors including, but not limited to, performance criteria, as described above.

FIG. 3 is a block diagram illustrating an example of a dependency tree 300 including multiple cloud resources, in accordance with one or more embodiments. In some embodiments, the dependency tree 300 includes multiple resources and/or resource stages arranged according to dependencies 310 between the multiple resources and/or resource stages. As described above, the resources and/or resource stages may be included as part of a single environment (e.g., a massive single page application, such as a console application). As such, the operation of the single environment may rely on the resources being properly executed with values propagated from resources in a superior rank 320 to resources in a subordinate rank 340. In some cases, the dependency tree 300 may include multiple levels of dependencies 310, such that a resource may be in an intermediate rank 330.

As illustrated in FIG. 3, the resources included in the dependency tree 300 may include, but are not limited to, cloud services (e.g., authentication, registry, announcement, etc.) that may provide information and/or functionality to a single environment (e.g., a console application). In some embodiments, the cloud services may be executed and/or implemented to provide access for a user of an IaaS system to user data, system resources (e.g., compute, storage, infrastructure, account), or additional and/or alternative resources included in an IaaS system. The cloud services may be separately maintained, for example by distinct teams of operators, and, as such, the configuration of each cloud resource may be handled by a different agent (e.g., a human moderator, automated system, etc.).

As described above, one possible approach to defining the multiple dependencies 310 may be to imperatively define each dependency, for example, starting from the subordinate resource 340, from which no resource or resource stage potentially depends, and defining each dependency manually, including both intermediate ranked resources 330 and superior ranked resources 320. Omitting such definitions could potentially result in redundant execution cycles for a resource, errors, or introduction of shortcuts and consequent latency penalties, all of which could negatively impact system performance. Alternatively, as described in reference to FIGS. 1-2, declarative configuration of resource dependencies 310 may permit an orchestrator to process the dependency tree 300 without such imperative definitions. Advantageously, implementing declarative configuration may reduce the complexity of defining the dependencies 310 of the dependency tree 300, which may result in considerable improvements to system performance when initializing an environment and/or when propagating resource changes, errors, updates, etc.

As illustrated in the following paragraphs, resources may include one or more stages, which may be individually configured with dependencies on resources in the dependency tree 300. As such, stage-wise dependencies may introduce redundancy in the dependency graph (e.g., dependency graph 120 of FIG. 1) that the orchestrator may be configured to eliminate.

Figure 4:
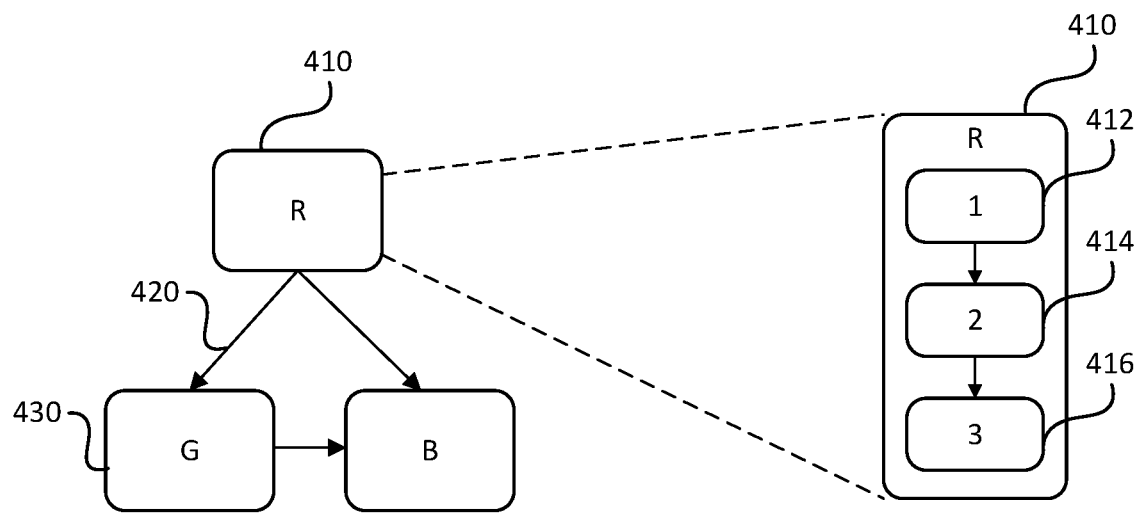
FIG. 4 illustrates an example dependency relationship of multiple interdependent cloud resources including one or more stages, in accordance with one or more embodiments.

FIG. 4 illustrates an example dependency relationship of multiple interdependent cloud resources including one or more stages, in accordance with one or more embodiments. As described above in reference to FIGS. 1-3, resources may describe applications, services, and/or cloud resources that, for example, may provide functionality or other capabilities in a single environment including multiple resources. In some embodiments, a resource may be a logical grouping of stages that manages a cloud resource (e.g., a compartment resource, a registry resource, a localization resource, etc.). A resource 410 may include one or more stages 412, where a stage 412 may be an a discrete operation of a resource that may be individually configured in a manner different from other stages of the same resource.

Advantageously, defining a resource as a series of one or more stages may allow separation of computationally expensive operations. For example, a plugin registry resource may include two separable operations. A first operation may include fetching a registry from a content delivery network. A second operation may include processing the registry based on a value received from a "Capabilities" resource. In some embodiments, the two steps can be defined as separate stages 412, for example, a "FETCH" stage and a "PROCESS" stage. In this way, multiple stages 412 may declare serial dependencies, for example a third stage 416 may depend on a second stage 414. In some embodiments, an output of a terminal stage (e.g., the third stage 416) can be a value of the resource (e.g., the first resource 410). In some cases, if a stage fails (e.g., through an error), the entire resource may return a default value. In some embodiments, individual stages (e.g., the second stage 414) may fail and return an error. In some cases, the orchestrator may propagate the error state down to dependent stages, as described in more detail in reference to FIG. 12.

Similarly, subordinate ranked resources 430 that may declare dependencies 420 from the resource 410 may also include one or more stages, which may declare different dependencies within the subordinate ranked resource 430. As described in more detail in reference to FIG. 5, below, stages may declare dependencies separate from other stages making up a part of the resource (e.g., in the foregoing example, the PROCESS stage may declare a dependency on the Capabilities Resource). Furthermore, in some embodiments, stages 412 may be cached, which may permit individual stages 412 to be excluded from being added to the execution queue in response to updates or changes to resources from which they do not depend (e.g., FETCH may be excluded from re-execution after changes to Capabilities).

Figure 5:
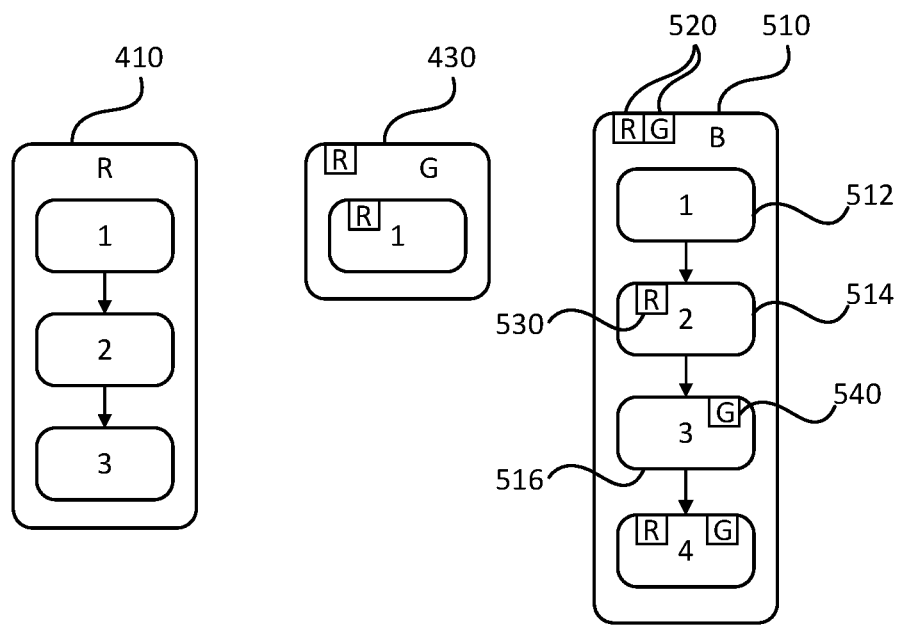
FIG. 5 illustrates an example of multiple cloud resources including one or more stages declaring dependencies, in accordance with one or more embodiments.

FIG. 5 illustrates an example of multiple cloud resources including one or more stages declaring dependencies, in accordance with one or more embodiments. The inclusion of stages (e.g., stage 412 of FIG. 4) may potentially reduce the computational resource demands of executing a resource by dividing the resource into separable operations, as described above. As illustrated in FIG. 5, a first resource 410 (resource "R") may include three stages. Similarly, a second resource 430 (resource "G") may include a single stage and a third resource 510 (resource "B") may include four stages. As may be seen in reference to the third resource 510, the resource B may declare one or more dependencies 520 on the first resource 410 and the second resource 430 (denoted by "R" and "G" badges). The stages of the third resource 510, however, may declare individual dependencies that may differ from the resource-level dependencies 520. For example, while a first stage 512 (stage "B1") may declare no individual dependencies (e.g., it does not depend on any superior resource), a second stage 514 B2 may declare a stage-level dependency 530 on the first resource 410 R, and a third stage 516 B3 may declare a different stage level dependency 540 on the second resource 430 G. Resource-level dependencies 520 may be a strict superset of the dependencies declared by the individual stages. In this way, if a resource-level dependency 520 is not explicitly stated by configuration, the orchestrator can compute the resource-level dependency as a union of all stage level dependencies.

In some embodiments, stages making up a resource may each depend from one another in sequence (e.g., the third stage 516 depends from the second stage 514, which in turn depends from the first stage 512). In some embodiments, stages may also depend from multiple superior stages, for example, when a resource includes more than one first stage (e.g., B1(A) and B1(B)). In some embodiments, the orchestrator may identify intra-resource dependencies as well as inter-resource dependencies. Such identifications may provide additional information when generating execution queues, as when a stage of a resource depends both on other resources and other stages within the same resource.

In some embodiments, stages may declare dependencies on resources, but not on stages within those resources. As shown in FIG. 5, the second stage 514 declares a dependency 530 on the first resource 410, but not any constituent stage of the first resource 410. In some embodiments, the approach of permitting resource-level dependency declarations may potentially reduce complexity of orchestration operations. For example, a potential benefit of permitting stage-level dependency declarations between resources (e.g., the second stage 514 declaring a dependency on a constituent stage of the first resource 410) may be outweighed by an increase in computational resources used to identify the dependencies on the stage-level, to topologically sort the stages, and to generate an execution queue using the stage-level dependencies. As such, the orchestrator may implement one or more approaches to balance accuracy and granularity against complexity and attendant computational expense. In some embodiments, the orchestrator may implement different approaches for each state of the resources included in the dependency tree (e.g., dependency tree 300 of FIG. 3), as described in the forthcoming paragraphs.

Figure 6:
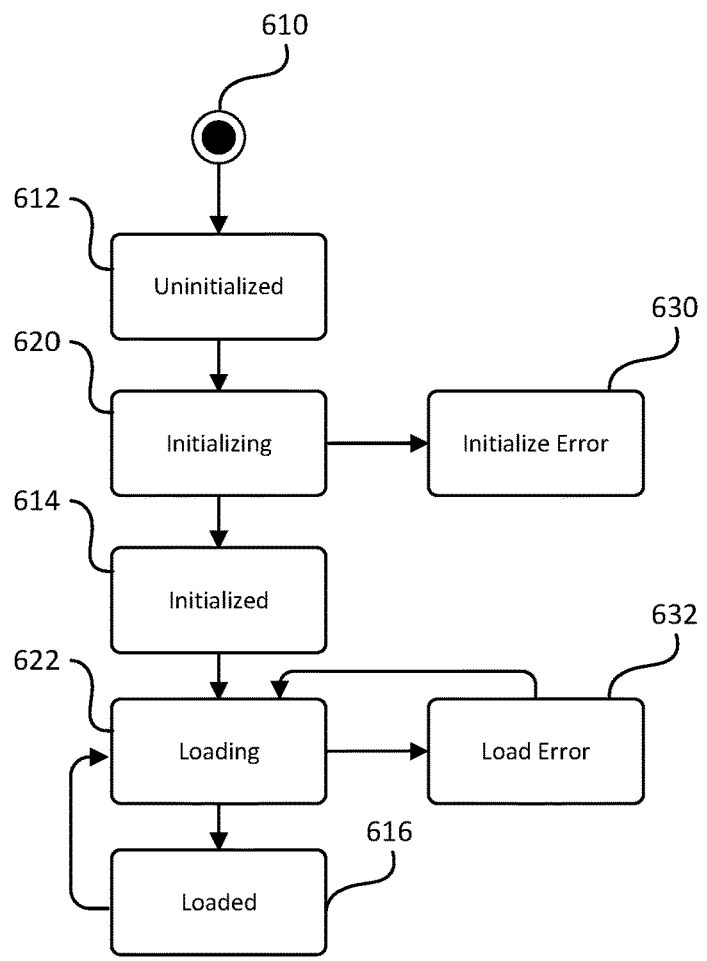
FIG. 6 is a block diagram illustrating an example sequence of resource states during initialization and execution, in accordance with one or more embodiments.

FIG. 6 is a block diagram illustrating an example sequence 600 of resource states during initialization and execution, in accordance with one or more embodiments. Initialization of resources has been described above, in reference to the topological sort operation and as part of the system 100 of FIG. 1. In some embodiments, resources and/or resource stages may be described by one or more states corresponding to the status of the resource. For example, starting from an entry point 610, a resource may first have an uninitialized state 612, corresponding, for example, to the resource being newly constructed (e.g., when the orchestrator receives the resource configuration in operation 140 of FIG. 1). After initialization (e.g., operation 148 of FIG. 1), the resource may have an initialized state 614. Similarly, once loaded, the resource may have a loaded state 616. In some embodiments, the loaded state 616 may be assigned when the terminal stage of the resource has completed execution and the resource has a value to pass to a dependent stage.

In some embodiments, an application can obtain a view into what the orchestrator is doing by requesting an orchestrator state. The orchestrator can aggregate the state of all resources it manages and can adopt an aggregate state that parallels the resource states. Furthermore, the application can subscribe to orchestrator state changes. In some cases, application requests (also referred to as "callbacks") may receive a list of resources and/or stages involved in a state transition. Advantageously, an aggregate orchestrator state may provide high-level performance information that can potentially improve debugging of the resource configurations and to allow opportunity for the application to recover from an error/crashed state.

Intermediate states may also be defined for a transitional period after an operation has begun changing a resource state (e.g., a state change is committed) but has not yet been completed. For example, between the uninitialized state 612 and the initialized state 614, a resource may have an intermediate initializing state 620. Similarly, between the initialized state 614 and the loaded state 616, a resource may have a loading state 622. In some embodiments, the orchestrator may receive notifications (e.g., by subscription to a notifier service) when a resource enters an intermediate state, as an example of an event to which the orchestrator may respond by updating the execution queue and re-executing resources that depend from the resource. Similarly, the loading state 622 may also be an intermediate state when the resource re-executes or reloads. In this way, the resource may return to the loaded state 616, via the loading state 622, from the loaded state 616.

Furthermore, the intermediate states may also lead to one or more error states, when the operation in progress is terminated unsuccessfully (e.g., aborted, failed, etc.). For example, if a fatal error occurs while the resource is in the initializing state 620, the resource may assume an initialize error state 630. Similarly, if a fatal error occurs while the resource is in the loading state 622, the resource may assume a load error state 632. The orchestrator may receive notifications of error states as part of modifying execution queues to reduce cascade failures of resource execution, as described in more detail in reference to FIG. 14.

Figure 7:
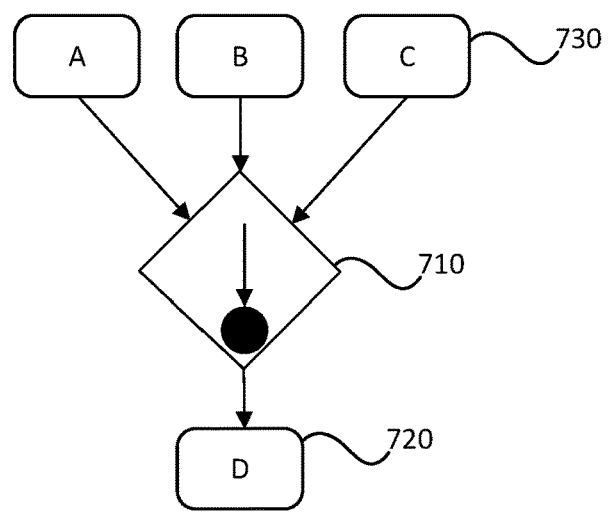
FIG. 7 illustrates an example logical operator for managing multiple dependencies between cloud resources, in accordance with one or more embodiments.

FIG. 7 illustrates an example logical operator 700 for managing multiple dependencies between cloud resources, in accordance with one or more embodiments. The logical operator 700 may include one or more different types of logic to modify the execution order and/or to manage timing or pre-conditions governing the execution of a resource and subsequent dependent stages/resources. One or more potentially different logical operators may be included, for example, in the resource configuration and may apply to a resource and/or to constituent stages of the resource.

In some embodiments, a toggle 710 can be added to the dependency graph described above (e.g., dependency graph 120 of FIG. 1) and/or the execution order (e.g., execution queue 130 of FIG. 1). The toggle 710 may permit the orchestrator to implement a coordinated multiple dependency between a subordinate resource 720 (resource "D") and multiple superior resources 730 (resources "A," "B," and "C") as a many-to-one relationship. For example, the toggle 710 can be included as a parameter of the resource configuration for the subordinate resource 720 and/or a constituent stage of the resource. In some embodiments, the orchestrator may implement the toggle 710 for execution control of the subordinate resource 720, for example, by waiting for every superior resource 730 to be in a loaded state (e.g., to output a value), as described in reference to FIG. 6, above. Once the toggle condition of the toggle 710 is met, the orchestrator may execute the subordinate resource 720. In this way, the toggle 710 may applies a logical condition to aggregate a value before passing the aggregate value to the subordinate resource 720. In some embodiments, the toggle 710 may permit the orchestrator to resolve multiple dependencies while potentially reducing the number of execution cycles of the subordinate resource 720. For example, when the superior resources 730 are not mutually dependent on the same or similar higher-order resources.

While FIG. 7 illustrates the toggle 710, the logical operator 700 also can describe different logical operations. For example, in some embodiments, a trigger can be attached to any resource or stage to elicit execution of the stage or resource and subsequent dependent resources and/or stages. A trigger describes an approach for the external environment to communicate with the orchestrator. For example, a trigger may be or include a user input, a network state change, or In some cases, a trigger can be implemented in a configuration of the resource as a parameter that incorporates a counter. A counter may describe a specific type of trigger that is linked to a timer or clock. It can be initialized with a value of zero. At predefined intervals, the counter may increment the value by 1. Counters can be attached to resources as an approach to induce dependent resources to refresh. This may be implemented as an approach to poll a resource for changes (e.g. to request an API endpoint). As such, when the condition (e.g., the counter) is satisfied, the orchestrator may execute the resource.

Figure 8:
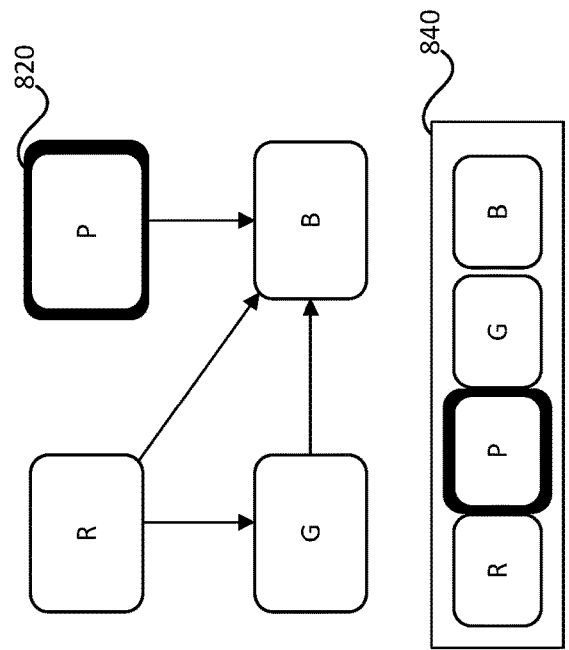
FIG. 8 illustrates an example technique for configuring a sort order of interdependent cloud resources, in accordance with one or more embodiments.
Figure 8:
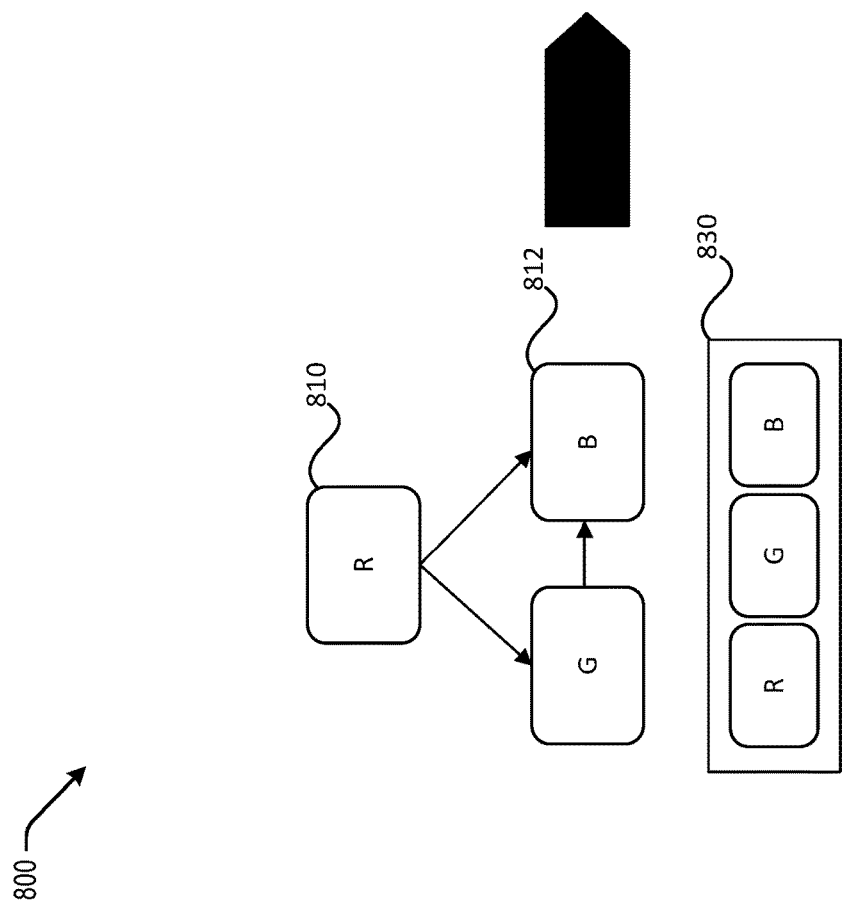

Similarly, the logical operator 700 can be a switch operator, by which a resource configuration may include reconfigurable dependencies as a one-to-many relationship. In an illustrative example, A is a top level resource, B and C are second level resources that both depend on A via a switch. Based on the value of A, the orchestrator can route execution flow to either B or C. Analogous logical expressions describing a switch operator may include an if-else statement and a switch-case statement. In this way, the switch operator may include logic conditions governing an automatic reconfiguration of dependencies. For example, a resource configuration may include rules and/or procedures by which the orchestrator may ignore a dependency ("switch off"), may change a dependency from one superior resource 730 to another (e.g., in response to satisfaction of a switch condition), or FIG. 8 illustrates an example technique 800 for configuring a sort order of interdependent cloud resources, in accordance with one or more embodiments. As described above in reference to the topological sort performed by the orchestrator (e.g., operation 144 of FIG. 1), the orchestrator may reorganize a dependency arrangement including one or more superior resources 810 and one or more subordinate resources 812 by adding a new resource 820. As an example of technique 800, adding the new resource 820 may potentially result from the orchestrator processing the resource configuration of one or more of the subordinate resources 812. For example, a subordinate resource 812 may declare a dependency on the new resource 820 in a resource configuration. Similarly, the subordinate resource 812 may declare a new or different dependency, to which the orchestrator may respond by identifying the new resource 820 as a superior resource 810.

In addition, the orchestrator may revise a sort order 830 by including the new resource 820 in a revised sort order 840. As described above in reference to FIG. 1, the orchestrator may prepare the revised sort order 840 by performing a topological sort including the new resource 820. As a result, the revised sort order 840 may include the new resource in a priority position relative to the subordinate resources 812. In some embodiments, the orchestrator may validate that no subordinate resource depends on any resource that comes after it in the revised sort order 840. Such validation, may also include detection of dependency cycles. In some embodiments, when the orchestrator detects a dependency cycle, the orchestrator may return a cyclic dependency error for the revised sort order 840 (e.g., as an aggregate error state). A dependency cycle may result, for example, through an incorrect dependency declaration in the resource configuration of the subordinate resource 812. As another example, a dependency cycle may occur for other reasons, including, but not limited to, those arising when a resource environment includes numerous interdependent resources.

The orchestrator may potentially resolve dependency cycles in one or more approaches. For example, the orchestrator may resolve a dependency cycle by adding logical operators to the configuration of the new resource 820, as described in more detail in reference to FIG. 7, above. For example, a logical operator may permit the orchestrator to implement procedures to switch off a dependency cycle, as when state and/or value changes may originate in a subordinate resource 812 upon which the new resource 820 depends (e.g., describing a situation where a cyclical dependency should not simply be eliminated). In some embodiments, the orchestrator may create an cyclic dependency error and return the error value to a resource developer (e.g., a human moderator).

In some embodiments, the orchestrator may remove the cyclic dependency by identifying a correct dependency relationship. For example, the orchestrator may simulate multiple dependency relationships by providing test initialization values in different configurations of a topological sort that do not include the cyclic dependency. In this way, the orchestrator may identify whether the cyclic dependency is avoidable, for example, if one of the possible dependency relationships does not generate an error. Such situations may occur in cases where, for example, an incorrect dependency declaration is included in the resource configuration.

Figure 9:
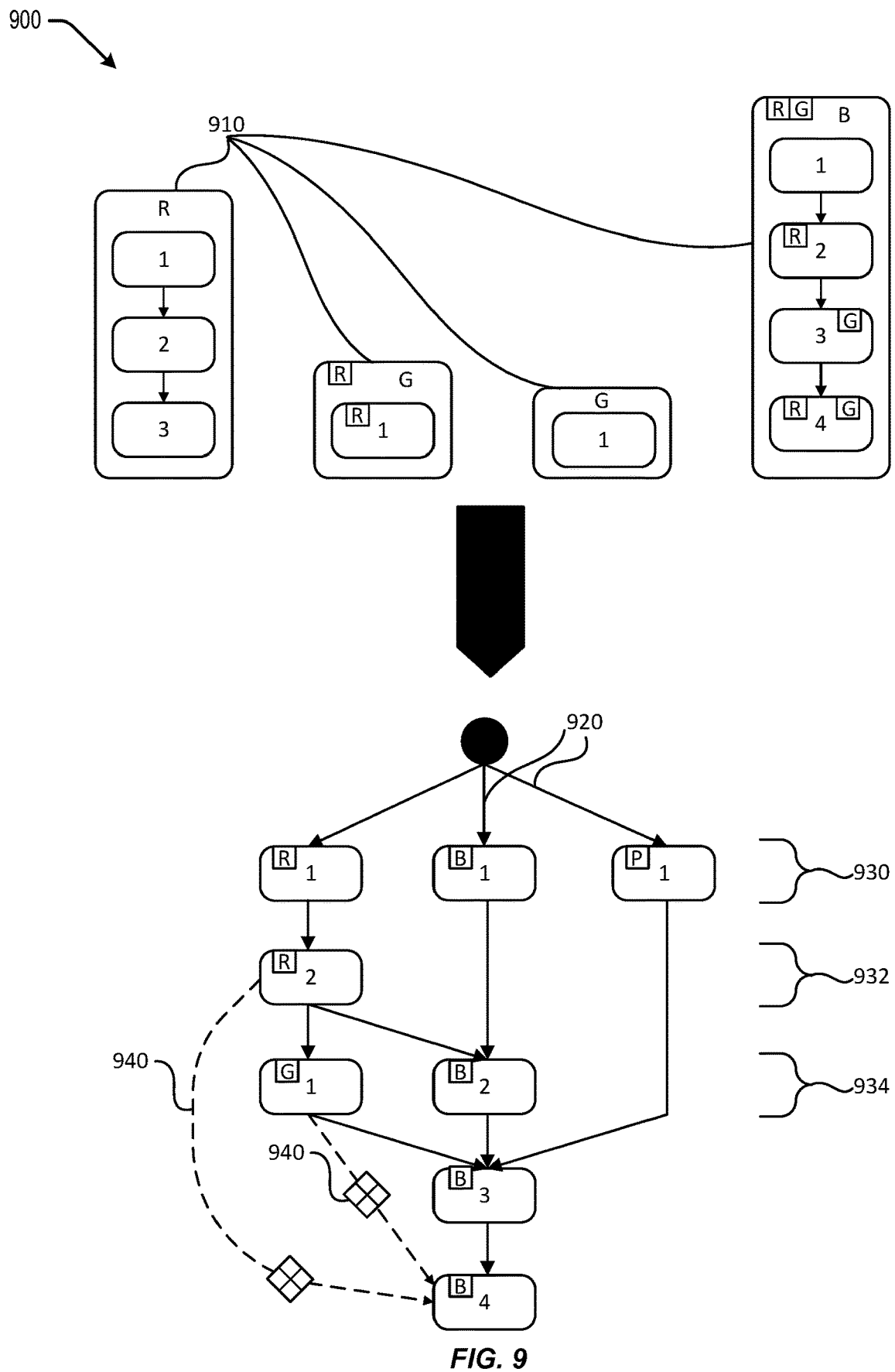
FIG. 9 illustrates an example technique for generating a dependency graph of interdependent cloud resources, in accordance with one or more embodiments.

FIG. 9 illustrates an example technique 900 for generating a dependency graph of interdependent cloud resources, in accordance with one or more embodiments. The orchestrator may implement the technique 900 to identify level order hierarchy in resource dependencies of stages, or stage dependencies of stages. As described above, the orchestrator may use the dependency graph to generate an execution queue (e.g., execution queue 130 of FIG. 1).

Using the identifications of resources 910, resource stages, and stage-level dependencies, the orchestrator may organize the constituent stages according to multiple linear dependencies 920. As illustrated in FIG. 9, the dependencies identified from stage-level resource configurations may permit the orchestrator to construct a multi-level graph which may include a first level 930, wherein resource stages in the first level do not declare a dependency on another resource stage. A second level 932, illustrated beneath the first level 930, may include resource stages declaring a dependency 920 on one or more resource stages in the first level 930. Similarly, a third level 934 may include resource stages declaring a dependency 920 on one or more resource stage in the second level 932 and/or the first level 930. Additional layers may also be included, for example, if a resource stage were to declare a dependency 920 on a resource stage in the third level 934. As illustrated, each dependency 920 may be represented visually as a line or an arrow starting with the superior resource stage and ending with the resource stage declaring the dependency 920.

In some embodiments, with an increasing number of subordinate levels, the dependency graph may include a resource stage that declares dependencies 920 on multiple superior resource stages. As described in more detail in reference to FIG. 7, above, the orchestrator may implement logic as an approach to reducing repeated execution. As an illustrative example, resource stage B3 may depend on resource stages G1, B2, and P1. In this way, when resource R2, from which both G1 and B2 depend, changes value, B3 could re-execute twice, each time it receives a new value from either G1 or B2. As such, the orchestrator may identify that a change in R2 would lead to changes in both G1 and B2, and may implement a logic operator (e.g., a toggle) to limit execution of B3 until both B2 and G1 provide new values. The orchestrator may implement alternative arrangements, for example, by ordering the execution queue, as described in more detail in reference to FIG. 10, below.

In some embodiments, the dependencies 920 identified from resource stage configurations may reveal one or more redundant dependencies 940. As an example, a redundant dependency 940 may result when a subordinate resource stage declares a dependency 920 on a subordinate resource stage in a higher level and a superior resource stage in a linear dependency relationship with both subordinate resource stages. As an illustrative example, a redundant dependency 940 would result, were resource stage B4 to declare a dependency on both B3 and R2, because B3 also depends from R2. From the point of view of the orchestrator, redundant dependencies introduce inefficiencies and potential sources of error into execution queues. For example, resource stage B4 may receive a new value from R2 at or about the same time as both G1 and B2. As such, B4 may execute or be in the midst of an execution at the time B3 provides it with a new value, triggering another execution. In this way, B4 may execute twice for a single change in R2 or, in some cases, it may return an error when B4 is triggered to execute while in the loading state (e.g., loading state 622 of FIG. 6).

In some embodiments, the orchestrator may identify redundant dependencies 940 in the dependency graph and may remove them, prior to generating the execution queue. In some cases, the orchestrator may modify the resource configuration itself to remove the declaration of the redundant dependency 940. In some cases, the orchestrator may remove the redundant dependency 940 form the dependency graph and may generate a notification for the resource developer to remove the redundant dependency 940, for example, by returning a warning to the developer after constructing the dependency graph.

In some embodiments, redundant dependencies 940 may differ from cyclical dependencies, in that redundant dependencies 940 may be invisible in a simple topological sort of resources and/or resource stages based on dependency declarations. For example, in a topological sort by resource stage, B4 will be inferior to both B3 and R2, with or without a redundant dependency 940 declared on R2. As such, eliminating the redundant dependencies 940 appearing in the dependency graph may permit the orchestrator to improve performance and reduce redundant execution of resource stages in a way that may be unachievable based on identification and removal of cyclical dependency alone.

Figure 10:
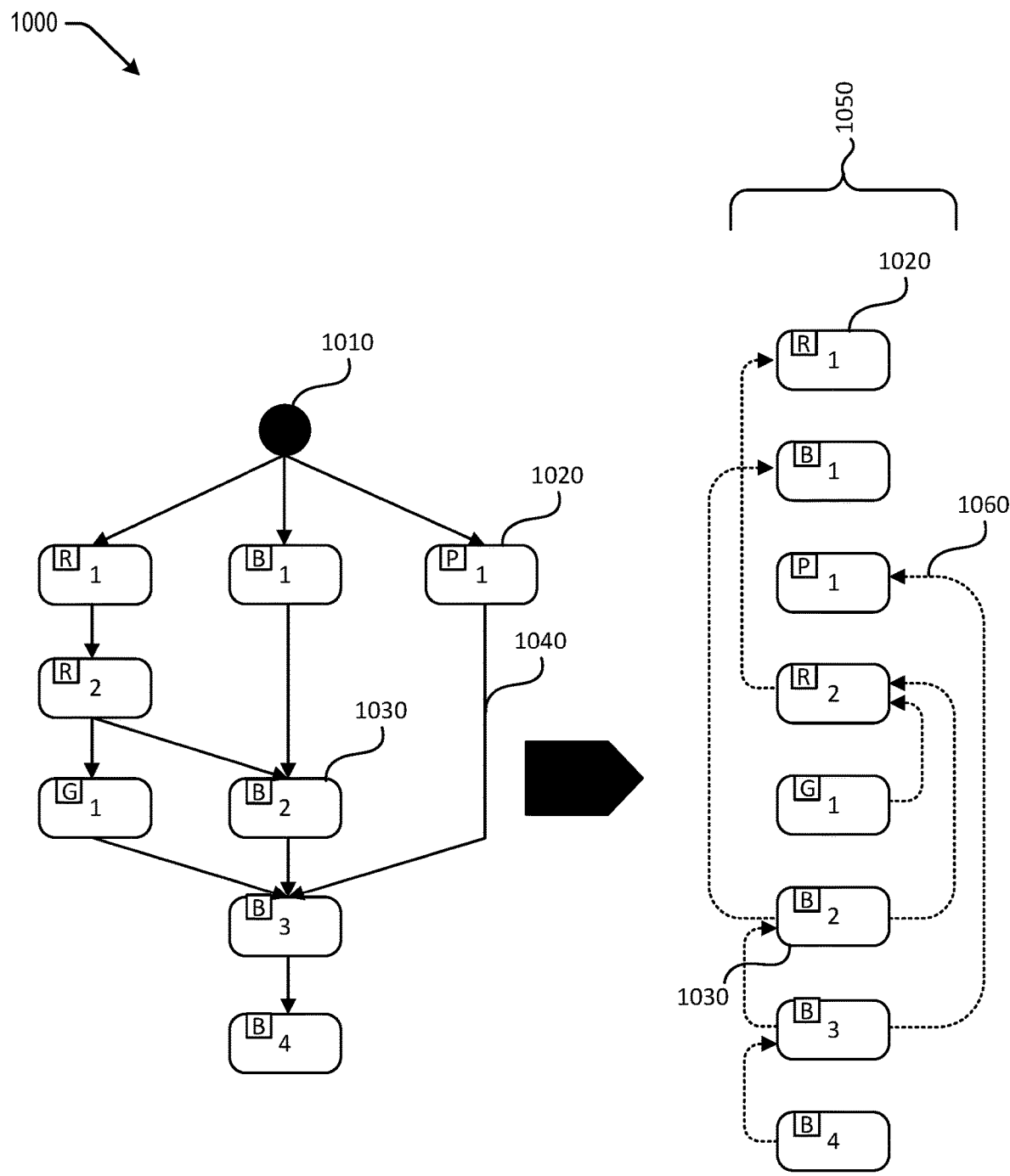
FIG. 10 illustrates an example technique for defining an execution order from a dependency graph of interdependent cloud resources, in accordance with one or more embodiments.

FIG. 10 illustrates an example technique 1000 for defining an execution order from a dependency graph of interdependent cloud resources, in accordance with one or more embodiments. As previously described in reference to FIG. 1, the orchestrator may initialize each resource it manages. Initialization may represent an entry point 1010 into the dependency graph (e.g., dependency graph 120 of FIG. 1). Using the levels of the dependency graph, the orchestrator may add each stage in the dependency graph in level-order to an execution queue 1050, which may be an example of the execution queue 130 of FIG. 1. As illustrated, superior stages 1020 may be connected to subordinate stages 1030 by linear dependencies 1040. In generating the execution queue 1050, adding resource stages in level-order may describe defining the priority of stages in the execution queue 1050 starting with the first level stages (e.g., first level 930 of FIG. 9) and adding subsequent subordinate stages level-wise until the each stage in the dependency graph is included in the execution queue. While the illustrated execution queue 1050 includes the stages in a left-to-right priority for each level, the orchestrator may add stages in a different order, depending, for example, on whether the stages have differing execution times or if the order may be influenced by other priorities, such as improving overall latency or performance.

In some embodiments, the orchestrator may insert an await command 1060 between a stage and its parent stages on the dependency graph. The await command 1060 may be a syntactical approach to moderating the execution queue 1050 without controlling execution of individual stages explicitly. As such, a dependent stage (e.g., B3) may await the execution of all stages from which it depends (e.g., both P1 and B2). As described above in reference to FIG. 6, execution may be signaled by a notification that a stage has transitioned from loading state to loaded state or by generating a value.

In some embodiments, stages and/or resources can also include an execution characteristic (e.g., "eager", "lazy," or "optimistic"). The execution characteristic may provide an approach for developers to influence the orchestrator, by indicating whether a stage is a high execution priority or if the orchestrator should prioritize other stages. The orchestrator may identify execution characteristics when processing resource configurations (e.g., operation 140 of FIG. 1). In some embodiments, the execution characteristic may affect whether a stage is included in the execution queue 1050.

As an illustrative example, a high priority (e.g., "eager") stage may be added to the execution queue in all conditions. By contrast, low priority (e.g., "optimistic") stages may be added, but in a low priority position in the execution queue 1050, such as the end of the execution queue 1050. Finally, very low priority (e.g., "lazy") stages may be omitted from the execution queue 1050, and instead may be executed by the orchestrator when a different condition is satisfied. For example, the orchestrator may execute a very low priority stage in response to a request from an application for which the orchestrator manages resource stage dependencies and generates an execution queue 1050. In some embodiments, the orchestrator will may nevertheless include a very low priority or low priority stage if it is depended on by a high priority stage. In this way, dependency relationships may be one of several factors affecting the position of a resource stage in the execution queue 1050.

Figure 11:
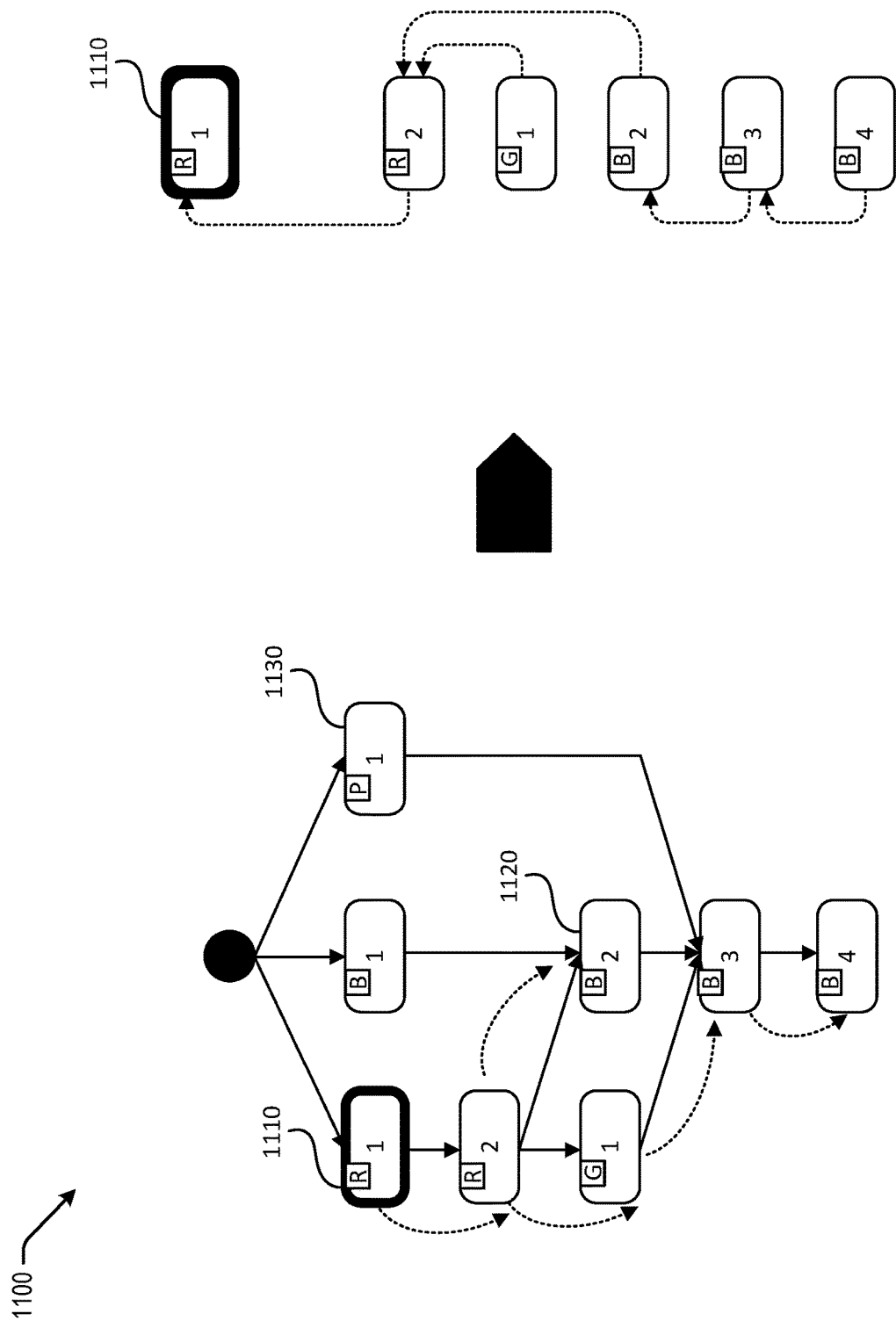
FIG. 11 illustrates an example technique for propagating a resource change to interdependent cloud resources, in accordance with one or more embodiments.

FIG. 11 illustrates an example technique 1100 for propagating a resource change to interdependent cloud resources, in accordance with one or more embodiments. Changes may occur, for example, when an application updates a parameter or a reload of a Resource is triggered (for example, as a retry in response to an Error). In some cases, the orchestrator may subscribe to a resource event notifier (e.g., a "REQUEST_UPDATE" event). As described above, an executing stage may change a resource state from an initialized state or loaded state to a loading state. As such, when the last constituent stage in a resource completes execution, the resource state moves to a loaded state.

When the orchestrator receives an event notification, it may traverses the dependency graph (e.g., operation 242 of FIG. 2) to find stages depending from the changed stage and may add the dependent stages to the execution queue (e.g., execution queue 1050 of FIG. 10). In an illustrative example, a stage 1110 (e.g., "R1") may undergo a change that affects the value of the stage. In response, the orchestrator may traverse the dependency graph and identify all dependent stages 1120 (e.g., R2, G1, B2, B3, and B4) of the stage 1110. Subsequent to identifying the dependent stages 1120, the orchestrator may add the dependent stages 1120 to the execution queue, and may exclude non-dependent stages 1130 (e.g., B1 and P1), which may be or include stages that do not depend from the stage 1110.

Figure 12:
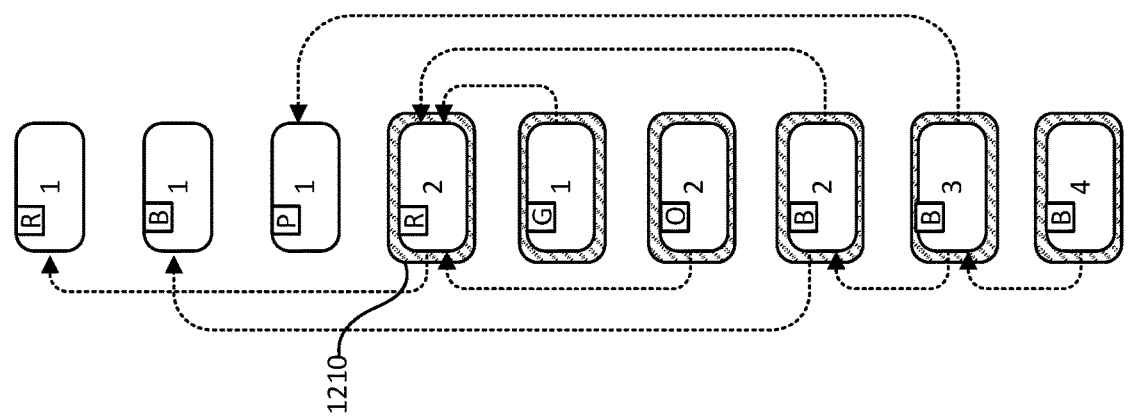
FIG. 12 illustrates an example technique for propagating a resource error state to dependent cloud resources, in accordance with one or more embodiments.
Figure 12:
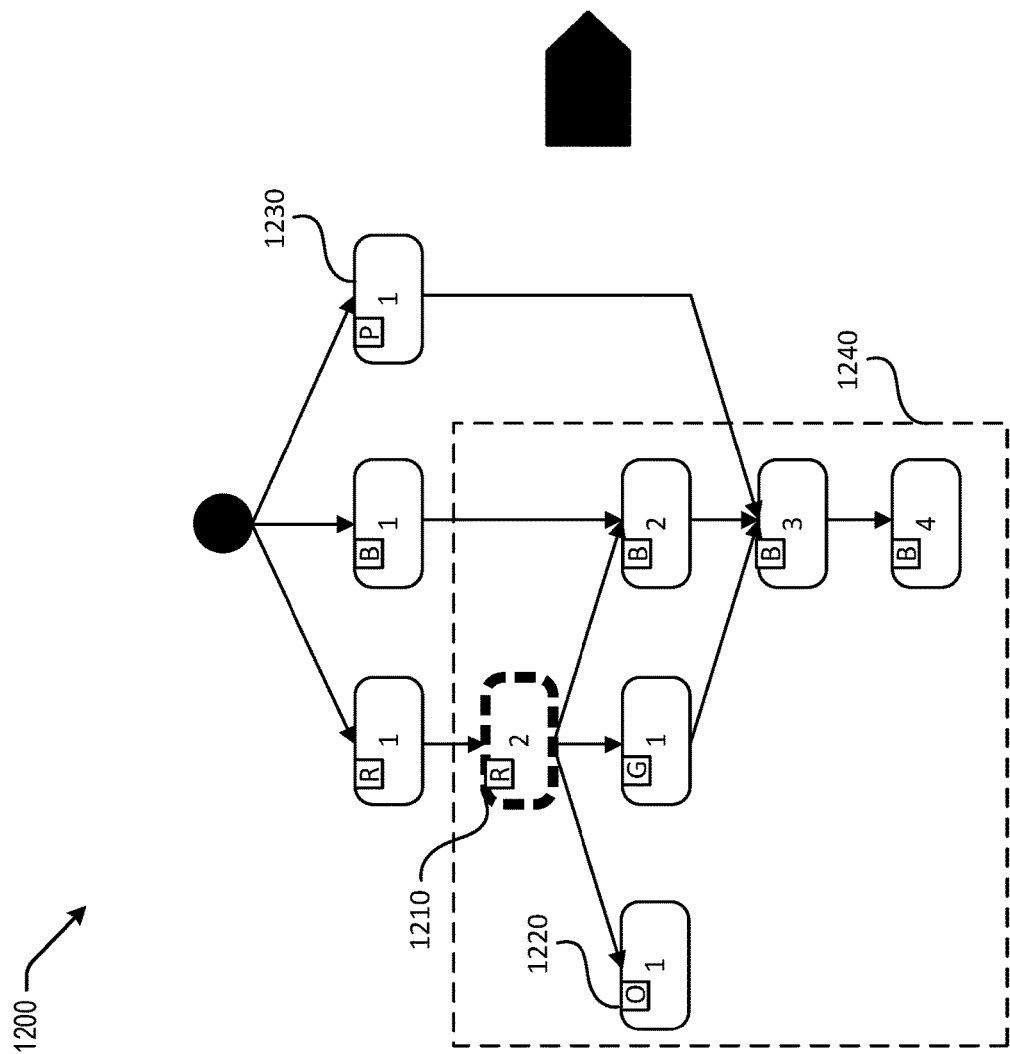

FIG. 12 illustrates an example technique 1200 for propagating a resource error state to dependent cloud resources, in accordance with one or more embodiments. A stage 1210 included in a dependency graph (e.g., dependency graph 120 of FIG. 1) may experience an error during initialization and/or execution, as described in more detail in reference to FIG. 6, above. Errors during initialization and loading may impact dependent resources in one or more ways, for example, when a dependent resource does not receive a value from a resource upon which it depends. Executing resources or resource stages that depend on a resource in an error state may introduce inefficiencies in terms of time and resources, and may lead to repeated execution of the same resources after the error state is resolved.

Advantageously, the orchestrator may modify the execution queue (e.g., execution queue 130 of FIG. 1) subsequent to identifying an error state in a resource or a resource stage having dependent resources or stages. In some cases, the orchestrator may identify when the stage 1210 experiences an error, for example, in that the stage 1210 may be configured to return an error notification. In this way, in response to the error notification, the orchestrator may move the stage 1210 or the resource of which it forms a part into a corresponding error state (e.g., a "LOAD_ERROR" state).

As one possible approach to reduce unnecessary stage execution, the orchestrator may move dependent resources and/or resource stages 1220 (e.g., 01, G1, B2, B3, B4) into a corresponding error state (e.g., the "LOAD_ERROR" state). The dependent stages 1220 may be identified by traversing the dependency graph as described in reference to FIG. 11, above, by which the orchestrator may define a subtree 1240. The subtree 1240 may be rooted at the stage 210 experiencing the error. In some embodiments, the orchestrator may continue to execute other paths in the graph, excluding the dependent stages 1220 from the execution queue. For example, an unaffected stage 1230 (e.g., B1, P1, or R1) may continue to be executed by the orchestrator, despite the stage 1210 being in an error state.

Figure 13:
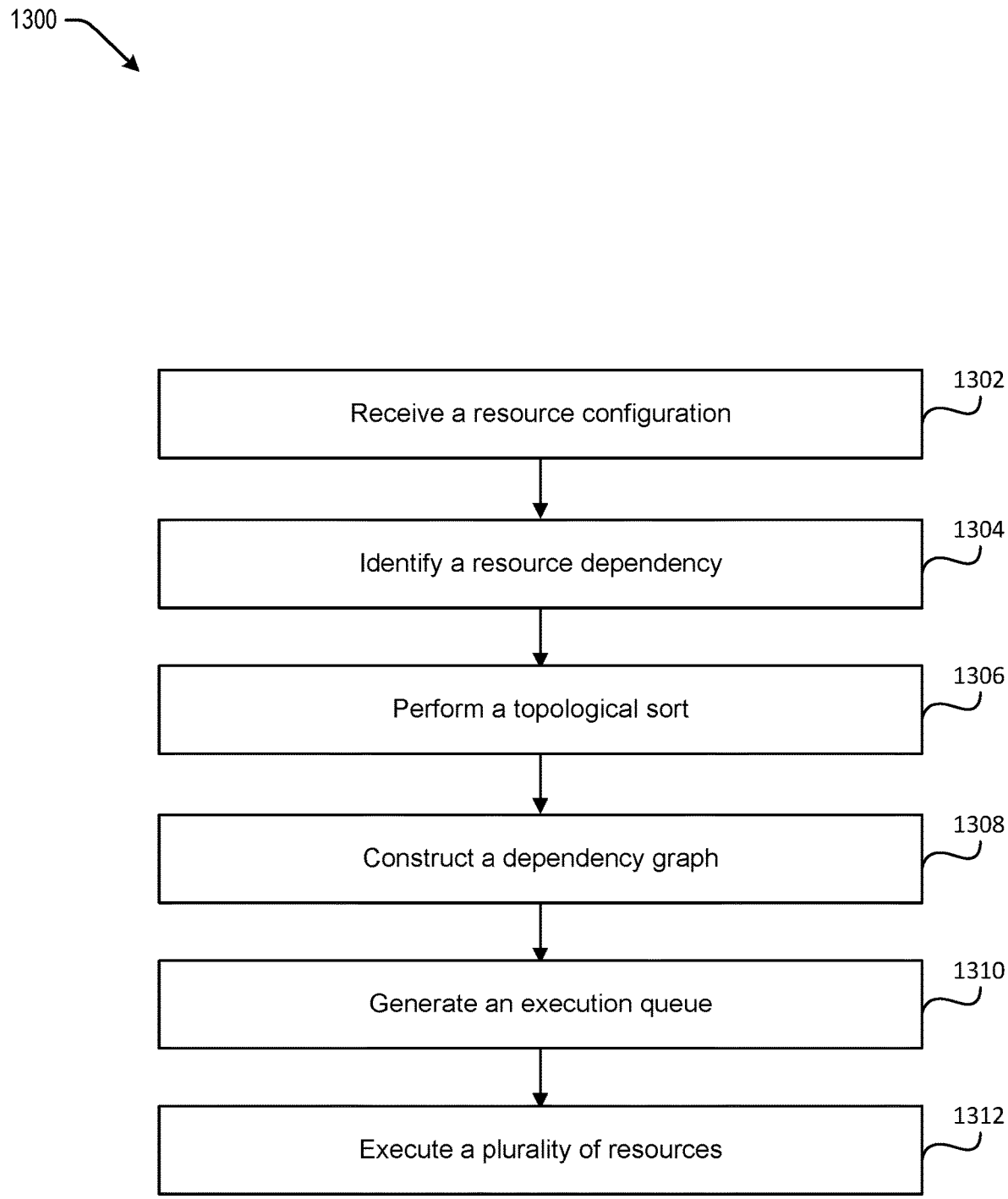
FIG. 13 illustrates an example flow for orchestrating execution of interdependent cloud resources, in accordance with one or more embodiments.

FIG. 13 illustrates an example flow 1300 orchestrating execution of interdependent cloud resources, in accordance with one or more embodiments. The operations of the flow 1300 can be implemented as hardware circuitry and/or stored as computer-readable instructions on a non-transitory computer-readable medium of a computer system. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

In an example, the flow 1300 includes an operation 1302, where the computer system receives a resource configuration (e.g., operation 140 of FIG. 1). As described in reference to FIG. 1, the computer system may implement an application initialization client, also referred to as an orchestrator, and may superintend the initialization and execution of a plurality of cloud resources. In some embodiments, the plurality of cloud resources may be related by a hierarchy of dependencies declared in resource configurations for each cloud resource. In operation 1302, the computer system may, for example, as part of an initialization process of a single console application, receive a resource configuration. The resource configuration may describe one or more parameters of a resource included in the console application including, but not limited to, a dependency declaration on another resource of the plurality of cloud resources. As described in more detail in reference to FIG. 4, the resources may include one or more constituent resource stages (e.g., stage 412 of FIG. 4), where stages may be the smallest subunit of the execution order for a resource. As described in more detail in reference to FIG. 5, each resource stage may declare stage-specific dependencies on another resource or a resource stage.

In an example, the flow 1300 includes an operation 1304, where the computer system identifies a resource dependency (e.g., operation 142 of FIG. 1). As part of the operation of the orchestrator, the computer system may identify the dependency declaration in the resource configuration. As described above, a declarative approach to dependency identification for the plurality of cloud resources may provide advantages in both latency and potential reduction of errors. In contrast, imperative approaches may include dependency delineation both upstream and downstream of the resource, and may result in increased complexity of resource configuration, inefficient configuration shortcuts, and vulnerability to propagation of initialization errors and loading errors.

In an example, the flow 1300 includes an operation 1306, where the computer system performs a topological sort (e.g., operation 144 of FIG. 1). In some embodiments, the topological sort may include sorting the plurality of cloud resources in order of dependency. For example, the orchestrator may sort the resources for which the resource configuration does not include a dependency declaration earlier in the order, with resources declaring dependencies on such resources as a first subordinate level, and resources declaring dependencies on the first subordinate level as a second subordinate level, etc. In this way, the orchestrator may define one or more level orders via the topological sort. As described above, resource stages may also declare stage-specific dependencies. In some embodiments, stages may be separated in the topological sort Similarly, when adding a new resource to an existing environment, for example, the console application, the computer system may repeat operations 1302-1306. In this way, the computer system may receive a resource configuration, identify a dependency in the resource configuration, and perform the topological sort of the resources. As a result, the computer system may include the newly added resource or resource stage in the sort order according to its relative level order.

In some embodiments, the computer system may detect cyclic dependencies after performing the topological sort. As described in more detail in reference to FIG. 8, a cyclic dependency may occur when a resource depends from and provides a value to the same resource or resource stage. Cyclic dependencies may result in execution queue errors and may cause failures in the operation of applications receiving values from the plurality of resources. The computer system may identify that a resource or a resource stage is included in two positions of the sort order, and from that may identify a cyclic dependency. In such cases, the computer system may eliminate one of the two dependencies (e.g., by following a procedure or by simulating both possible sort orders) and/or it may generate a cyclic dependency notification to alert a human moderator to the existence of a cyclic dependency.

In an example, the flow 1300 includes an operation 1308, where the computer system constructs a dependency graph (e.g., operation 146 of FIG. 1). The dependency graph (e.g., dependency graph 120 of FIG. 1) may include the resources or resource stages in a hierarchal level (e.g., first level 930 of FIG. 9) identified in the topological sort of operation 1306. The dependency graph may be rooted at an entry point, which may define, in some cases, a point at which the earliest dependency may be traced. In some embodiments, the computer system may process the dependency graph in one or more ways, including identifying and removing redundant dependencies, as described in more detail in reference to FIG. 9.

In an example, the flow 1300 includes an operation 1310, where the computer system generates an execution queue (e.g., operation 150 of FIG. 1). The execution queue (e.g., execution queue 130 of FIG. 1) may include the resource stages included in the dependency graph, ordered according to level order. For example, the resource stages of a first level in the dependency graph may be included first, followed by those of a second level, etc., until each of the resources included in the dependency graph are included in the execution queue.

In an example, the flow 1300 includes an operation 1312, where the computer system executes a plurality of resources (e.g., operation 152 of FIG. 1). As part of managing the initialization and execution of cloud resources, the computer system may execute the resource stages according to the execution queue. As described in more detail in reference to FIG. 1, the execution of the resource stages provide progressive rendering of computing environment of which the resource stages form a part. For example, as described in reference to FIG. 14, implementation of the operations of the flow 1400, as through the orchestrator described above, may provide a progressively updated execution queue. Progressive updating may be faciliatate through addition of new resources to an existing dependency graph and/or through modification of the execution queue in response to updates affecting one or more resources included in the dependency graph.

Figure 14:
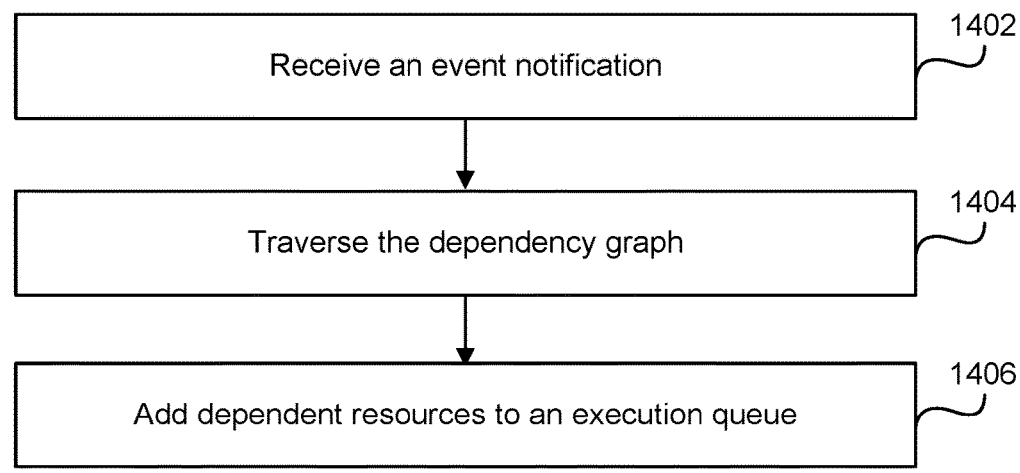
FIG. 14 illustrates an example flow for propagating updates to interdependent cloud resources, in accordance with one or more embodiments.

FIG. 14 illustrates an example flow 1400 for propagating updates to interdependent cloud resources, in accordance with one or more embodiments. The operations of the flow 1400 can be implemented as hardware circuitry and/or stored as computer-readable instructions on a non-transitory computer-readable medium of a computer system. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

In an example, the flow 1300 includes an operation 1302, where the computer system receives an event notification (e.g., operation 240 of FIG. 2). As described in more detail in reference to FIG. 2, the operation of the computer system (e.g., through action of the orchestrator), may include progressive rendering of the computing environment (e.g., the single console application). In some embodiments, a resource or a resource stage may be updated during the operation of the computing environment. For example, a resource stage may experience an error, or may receive input that causes it to re-execute or generate a new output value. In some cases, the computer system may receive a notification (e.g., by subscribing to a notifier service) of an update event affecting the resource stage. In response, the computer system may be configured to re-execute resource and/or resource stages that declare dependencies on the resource stage subject to the update event.

In an example, the flow 1300 includes an operation 1304, where the computer system traverses the dependency graph (e.g., operation 240 of FIG. 2). As an approach for identifying the dependent resources and/or resource stages that will receive the updated value or the error state from the stage identified in operation 1302 (e.g., operation 242 of FIG. 2), the computer system may traverse the dependency graph. Traversal of the dependency graph may describe an operation by which the computer system may define the resource stage subject to the update event as a new entry point to the dependency graph, and may identify all subsequent dependent stages of the new entry point. As described in reference to FIG. 2 and FIG. 11, the computer system may follow all dependency relationships and identify all stages that will receive a value from the updated stage or its dependents.

In an example, the flow 1300 includes an operation 1306, where the computer system adds dependent resources to the execution queue (e.g., operation 240 of FIG. 2). To potentially limit the number of stages that are re-executed following the update event, the computer system may add the stages identified in operation 1304 to the execution queue. The order of the addition may follow the level-order approach used for generating the execution queue as described in reference to FIG. 1 and FIG. 13.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 15:
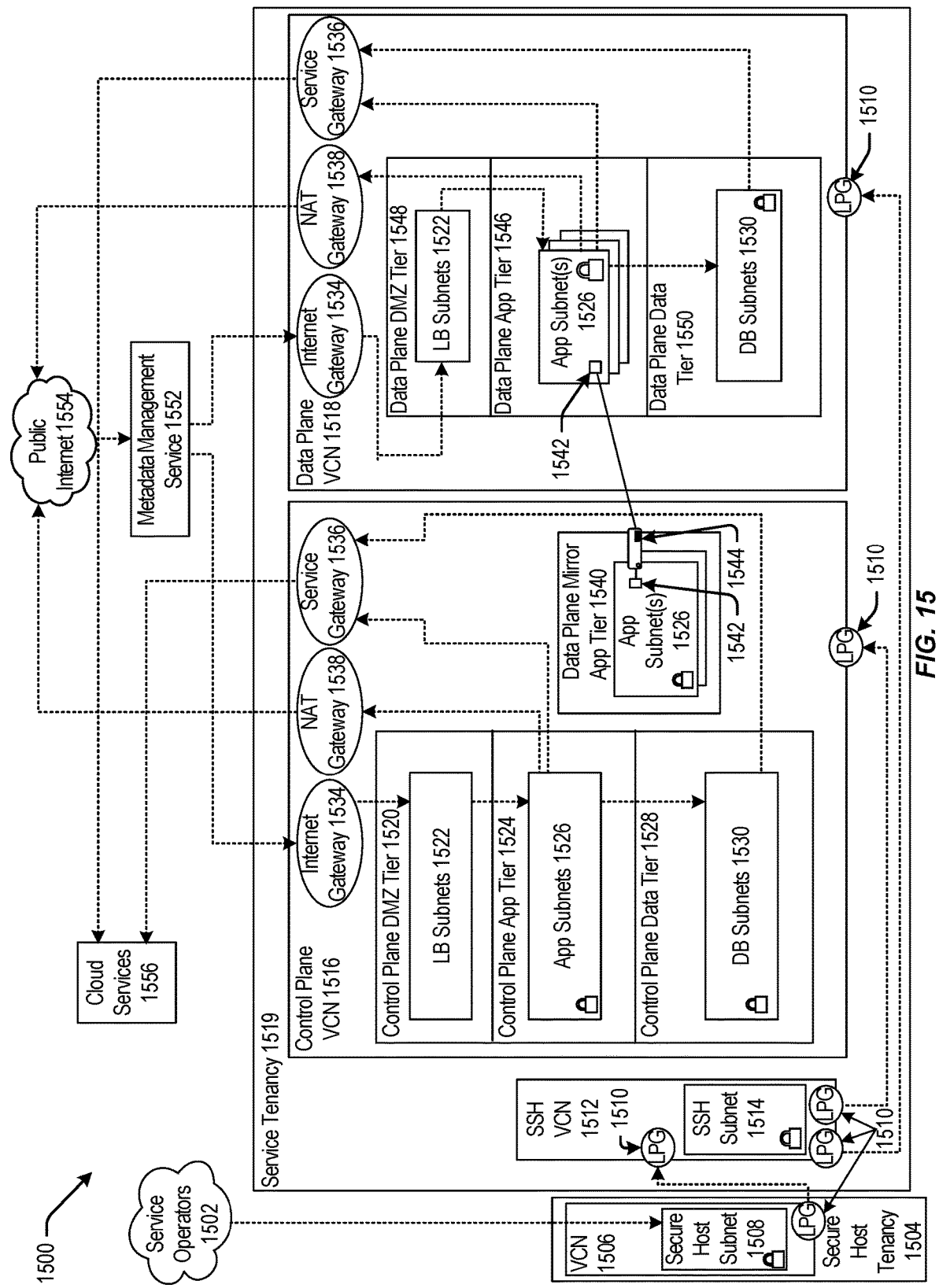
FIG. 15 is a block diagram illustrating one pattern for implementing a cloud infrastructure as a service system, according to at least one embodiment.

FIG. 15 is a block diagram 1500 illustrating an example pattern of an IaaS architecture, according to at least one embodiment. Service operators 1502 can be communicatively coupled to a secure host tenancy 1504 that can include a virtual cloud network (VCN) 1506 and a secure host subnet 1508. In some examples, the service operators 1502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1506 and/or the Internet.

The VCN 1506 can include a local peering gateway (LPG) 1510 that can be communicatively coupled to a secure shell (SSH) VCN 1512 via an LPG 1510 contained in the SSH VCN 1512. The SSH VCN 1512 can include an SSH subnet 1514, and the SSH VCN 1512 can be communicatively coupled to a control plane VCN 1516 via the LPG 1510 contained in the control plane VCN 1516. Also, the SSH VCN 1512 can be communicatively coupled to a data plane VCN 1518 via an LPG 1510. The control plane VCN 1516 and the data plane VCN 1518 can be contained in a service tenancy 1519 that can be owned and/or operated by the IaaS provider.

The control plane VCN 1516 can include a control plane demilitarized zone (DMZ) tier 1520 that acts as a perimeter network (e.g., portions of a corporate network between the corporate intranet and external networks). The DMZ-based servers may have restricted responsibilities and help keep security breaches contained. Additionally, the DMZ tier 1520 can include one or more load balancer (LB) subnet(s) 1522, a control plane app tier 1524 that can include app subnet(s) 1526, a control plane data tier 1528 that can include database (DB) subnet(s) 1530 (e.g., frontend DB subnet(s) and/or backend DB subnet(s)). The LB subnet(s) 1522 contained in the control plane DMZ tier 1520 can be communicatively coupled to the app subnet(s) 1526 contained in the control plane app tier 1524 and an Internet gateway 1534 that can be contained in the control plane VCN 1516, and the app subnet(s) 1526 can be communicatively coupled to the DB subnet(s) 1530 contained in the control plane data tier 1528 and a service gateway 1536 and a network address translation (NAT) gateway 1538. The control plane VCN 1516 can include the service gateway 1536 and the NAT gateway 1538.

The control plane VCN 1516 can include a data plane mirror app tier 1540 that can include app subnet(s) 1526. The app subnet(s) 1526 contained in the data plane mirror app tier 1540 can include a virtual network interface controller (VNIC) 1542 that can execute a compute instance 1544. The compute instance 1544 can communicatively couple the app subnet(s) 1526 of the data plane mirror app tier 1540 to app subnet(s) 1526 that can be contained in a data plane app tier 1546.

The data plane VCN 1518 can include the data plane app tier 1546, a data plane DMZ tier 1548, and a data plane data tier 1550. The data plane DMZ tier 1548 can include LB subnet(s) 1522 that can be communicatively coupled to the app subnet(s) 1526 of the data plane app tier 1546 and the Internet gateway 1534 of the data plane VCN 1518. The app subnet(s) 1526 can be communicatively coupled to the service gateway 1536 of the data plane VCN 1518 and the NAT gateway 1538 of the data plane VCN 1518. The data plane data tier 1550 can also include the DB subnet(s) 1530 that can be communicatively coupled to the app subnet(s) 1526 of the data plane app tier 1546.

The Internet gateway 1534 of the control plane VCN 1516 and of the data plane VCN 1518 can be communicatively coupled to a metadata management service 1552 that can be communicatively coupled to public Internet 1554. Public Internet 1554 can be communicatively coupled to the NAT gateway 1538 of the control plane VCN 1516 and of the data plane VCN 1518. The service gateway 1536 of the control plane VCN 1516 and of the data plane VCN 1518 can be communicatively couple to cloud services 1556.

In some examples, the service gateway 1536 of the control plane VCN 1516 or of the data plan VCN 1518 can make application programming interface (API) calls to cloud services 1556 without going through public Internet 1554. The API calls to cloud services 1556 from the service gateway 1536 can be one-way: the service gateway 1536 can make API calls to cloud services 1556, and cloud services 1556 can send requested data to the service gateway 1536. But, cloud services 1556 may not initiate API calls to the service gateway 1536.

In some examples, the secure host tenancy 1504 can be directly connected to the service tenancy 1519, which may be otherwise isolated. The secure host subnet 1508 can communicate with the SSH subnet 1514 through an LPG 1510 that may enable two-way communication over an otherwise isolated system. Connecting the secure host subnet 1508 to the SSH subnet 1514 may give the secure host subnet 1508 access to other entities within the service tenancy 1519.

The control plane VCN 1516 may allow users of the service tenancy 1519 to set up or otherwise provision desired resources. Desired resources provisioned in the control plane VCN 1516 may be deployed or otherwise used in the data plane VCN 1518. In some examples, the control plane VCN 1516 can be isolated from the data plane VCN 1518, and the data plane mirror app tier 1540 of the control plane VCN 1516 can communicate with the data plane app tier 1546 of the data plane VCN 1518 via VNICs 1542 that can be contained in the data plane mirror app tier 1540 and the data plane app tier 1546.

In some examples, users of the system, or customers, can make requests, for example create, read, update, or delete (CRUD) operations, through public Internet 1554 that can communicate the requests to the metadata management service 1552. The metadata management service 1552 can communicate the request to the control plane VCN 1516 through the Internet gateway 1534. The request can be received by the LB subnet(s) 1522 contained in the control plane DMZ tier 1520. The LB subnet(s) 1522 may determine that the request is valid, and in response to this determination, the LB subnet(s) 1522 can transmit the request to app subnet(s) 1526 contained in the control plane app tier 1524. If the request is validated and requires a call to public Internet 1554, the call to public Internet 1554 may be transmitted to the NAT gateway 1538 that can make the call to public Internet 1554. Memory that may be desired to be stored by the request can be stored in the DB subnet(s) 1530.

In some examples, the data plane mirror app tier 1540 can facilitate direct communication between the control plane VCN 1516 and the data plane VCN 1518. For example, changes, updates, or other suitable modifications to configuration may be desired to be applied to the resources contained in the data plane VCN 1518. Via a VNIC 1542, the control plane VCN 1516 can directly communicate with, and can thereby execute the changes, updates, or other suitable modifications to configuration to, resources contained in the data plane VCN 1518.

In some embodiments, the control plane VCN 1516 and the data plane VCN 1518 can be contained in the service tenancy 1519. In this case, the user, or the customer, of the system may not own or operate either the control plane VCN 1516 or the data plane VCN 1518. Instead, the IaaS provider may own or operate the control plane VCN 1516 and the data plane VCN 1518, both of which may be contained in the service tenancy 1519. This embodiment can enable isolation of networks that may prevent users or customers from interacting with other users', or other customers', resources. Also, this embodiment may allow users or customers of the system to store databases privately without needing to rely on public Internet 1554, which may not have a desired level of security, for storage.

In other embodiments, the LB subnet(s) 1522 contained in the control plane VCN 1516 can be configured to receive a signal from the service gateway 1536. In this embodiment, the control plane VCN 1516 and the data plane VCN 1518 may be configured to be called by a customer of the IaaS provider without calling public Internet 1554. Customers of the IaaS provider may desire this embodiment since database(s) that the customers use may be controlled by the IaaS provider and may be stored on the service tenancy 1519, which may be isolated from public Internet 1554.

Figure 16:
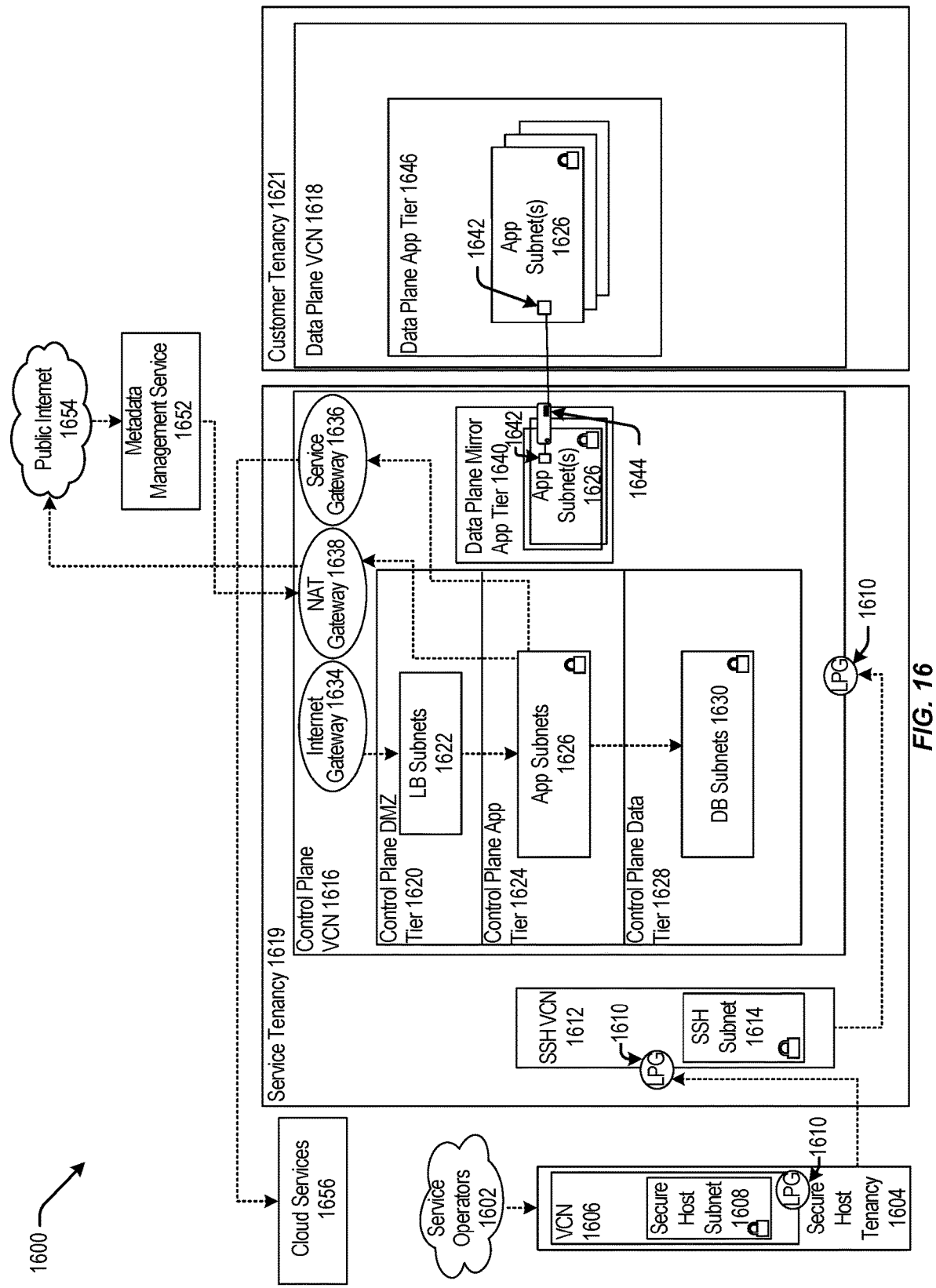
FIG. 16 is a block diagram illustrating another pattern for implementing a cloud infrastructure as a service system, according to at least one embodiment.

FIG. 16 is a block diagram 1600 illustrating another example pattern of an IaaS architecture, according to at least one embodiment. Service operators 1602 (e.g. service operators 1502 of FIG. 15) can be communicatively coupled to a secure host tenancy 1604 (e.g. the secure host tenancy 1504 of FIG. 15) that can include a virtual cloud network (VCN) 1606 (e.g. the VCN 1506 of FIG. 15) and a secure host subnet 1608 (e.g. the secure host subnet 1508 of FIG. 15). The VCN 1606 can include a local peering gateway (LPG) 1610 (e.g. the LPG 1510 of FIG. 15) that can be communicatively coupled to a secure shell (SSH) VCN 1612 (e.g. the SSH VCN 1512 of FIG. 15) via an LPG 1510 contained in the SSH VCN 1612. The SSH VCN 1612 can include an SSH subnet 1614 (e.g. the SSH subnet 1514 of FIG. 15), and the SSH VCN 1612 can be communicatively coupled to a control plane VCN 1616 (e.g. the control plane VCN 1516 of FIG. 15) via an LPG 1610 contained in the control plane VCN 1616. The control plane VCN 1616 can be contained in a service tenancy 1619 (e.g. the service tenancy 1519 of FIG. 15), and the data plane VCN 1618 (e.g. the data plane VCN 1518 of FIG. 15) can be contained in a customer tenancy 1621 that may be owned or operated by users, or customers, of the system.

The control plane VCN 1616 can include a control plane DMZ tier 1620 (e.g. the control plane DMZ tier 1520 of FIG. 15) that can include LB subnet(s) 1622 (e.g. LB subnet(s) 1522 of FIG. 15), a control plane app tier 1624 (e.g. the control plane app tier 1524 of FIG. 15) that can include app subnet(s) 1626 (e.g. app subnet(s) 1526 of FIG. 15), a control plane data tier 1628 (e.g. the control plane data tier 1528 of FIG. 15) that can include database (DB) subnet(s) 1630 (e.g. similar to DB subnet(s) 1530 of FIG. 15). The LB subnet(s) 1622 contained in the control plane DMZ tier 1620 can be communicatively coupled to the app subnet(s) 1626 contained in the control plane app tier 1624 and an Internet gateway 1634 (e.g. the Internet gateway 1534 of FIG. 15) that can be contained in the control plane VCN 1616, and the app subnet(s) 1626 can be communicatively coupled to the DB subnet(s) 1630 contained in the control plane data tier 1628 and a service gateway 1636 (e.g. the service gateway of FIG. 15) and a network address translation (NAT) gateway 1638 (e.g. the NAT gateway 1538 of FIG. 15). The control plane VCN 1616 can include the service gateway 1636 and the NAT gateway 1638.

The control plane VCN 1616 can include a data plane mirror app tier 1640 (e.g. the data plane mirror app tier 1540 of FIG. 15) that can include app subnet(s) 1626. The app subnet(s) 1626 contained in the data plane mirror app tier 1640 can include a virtual network interface controller (VNIC) 1642 (e.g. the VNIC of 1542) that can execute a compute instance 1644 (e.g. similar to the compute instance 1544 of FIG. 15). The compute instance 1644 can facilitate communication between the app subnet(s) 1626 of the data plane mirror app tier 1640 and the app subnet(s) 1626 that can be contained in a data plane app tier 1646 (e.g. the data plane app tier 1546 of FIG. 15) via the VNIC 1642 contained in the data plane mirror app tier 1640 and the VNIC 1642 contained in the data plan app tier 1646.

The Internet gateway 1634 contained in the control plane VCN 1616 can be communicatively coupled to a metadata management service 1652 (e.g. the metadata management service 1552 of FIG. 15) that can be communicatively coupled to public Internet 1654 (e.g. public Internet 1554 of FIG. 15). Public Internet 1654 can be communicatively coupled to the NAT gateway 1638 contained in the control plane VCN 1616. The service gateway 1636 contained in the control plane VCN 1616 can be communicatively couple to cloud services 1656 (e.g. cloud services 1556 of FIG. 15).

In some examples, the data plane VCN 1618 can be contained in the customer tenancy 1621. In this case, the IaaS provider may provide the control plane VCN 1616 for each customer, and the IaaS provider may, for each customer, set up a unique compute instance 1644 that is contained in the service tenancy 1619. Each compute instance 1644 may allow communication between the control plane VCN 1616, contained in the service tenancy 1619, and the data plane VCN 1618 that is contained in the customer tenancy 1621. The compute instance 1644 may allow resources, that are provisioned in the control plane VCN 1616 that is contained in the service tenancy 1619, to be deployed or otherwise used in the data plane VCN 1618 that is contained in the customer tenancy 1621.

In other examples, the customer of the IaaS provider may have databases that live in the customer tenancy 1621. In this example, the control plane VCN 1616 can include the data plane mirror app tier 1640 that can include app subnet(s) 1626. The data plane mirror app tier 1640 can reside in the data plane VCN 1618, but the data plane mirror app tier 1640 may not live in the data plane VCN 1618. That is, the data plane mirror app tier 1640 may have access to the customer tenancy 1621, but the data plane mirror app tier 1640 may not exist in the data plane VCN 1618 or be owned or operated by the customer of the IaaS provider. The data plane mirror app tier 1640 may be configured to make calls to the data plane VCN 1618 but may not be configured to make calls to any entity contained in the control plane VCN 1616. The customer may desire to deploy or otherwise use resources in the data plane VCN 1618 that are provisioned in the control plane VCN 1616, and the data plane mirror app tier 1640 can facilitate the desired deployment, or other usage of resources, of the customer.

In some embodiments, the customer of the IaaS provider can apply filters to the data plane VCN 1618. In this embodiment, the customer can determine what the data plane VCN 1618 can access, and the customer may restrict access to public Internet 1654 from the data plane VCN 1618. The IaaS provider may not be able to apply filters or otherwise control access of the data plane VCN 1618 to any outside networks or databases. Applying filters and controls by the customer onto the data plane VCN 1618, contained in the customer tenancy 1621, can help isolate the data plane VCN 1618 from other customers and from public Internet 1654.

In some embodiments, cloud services 1656 can be called by the service gateway 1636 to access services that may not exist on public Internet 1654, on the control plane VCN 1616, or on the data plane VCN 1618. The connection between cloud services 1656 and the control plane VCN 1616 or the data plane VCN 1618 may not be live or continuous. Cloud services 1656 may exist on a different network owned or operated by the IaaS provider. Cloud services 1656 may be configured to receive calls from the service gateway 1636 and may be configured to not receive calls from public Internet 1654. Some cloud services 1656 may be isolated from other cloud services 1656, and the control plane VCN 1616 may be isolated from cloud services 1656 that may not be in the same region as the control plane VCN 1616. For example, the control plane VCN 1616 may be located in "Region 1," and cloud service "Deployment 15," may be located in Region 1 and in "Region 2." If a call to Deployment 15 is made by the service gateway 1636 contained in the control plane VCN 1616 located in Region 1, the call may be transmitted to Deployment 15 in Region 1. In this example, the control plane VCN 1616, or Deployment 15 in Region 1, may not be communicatively coupled to, or otherwise in communication with, Deployment 15 in Region 2.

Figure 17:
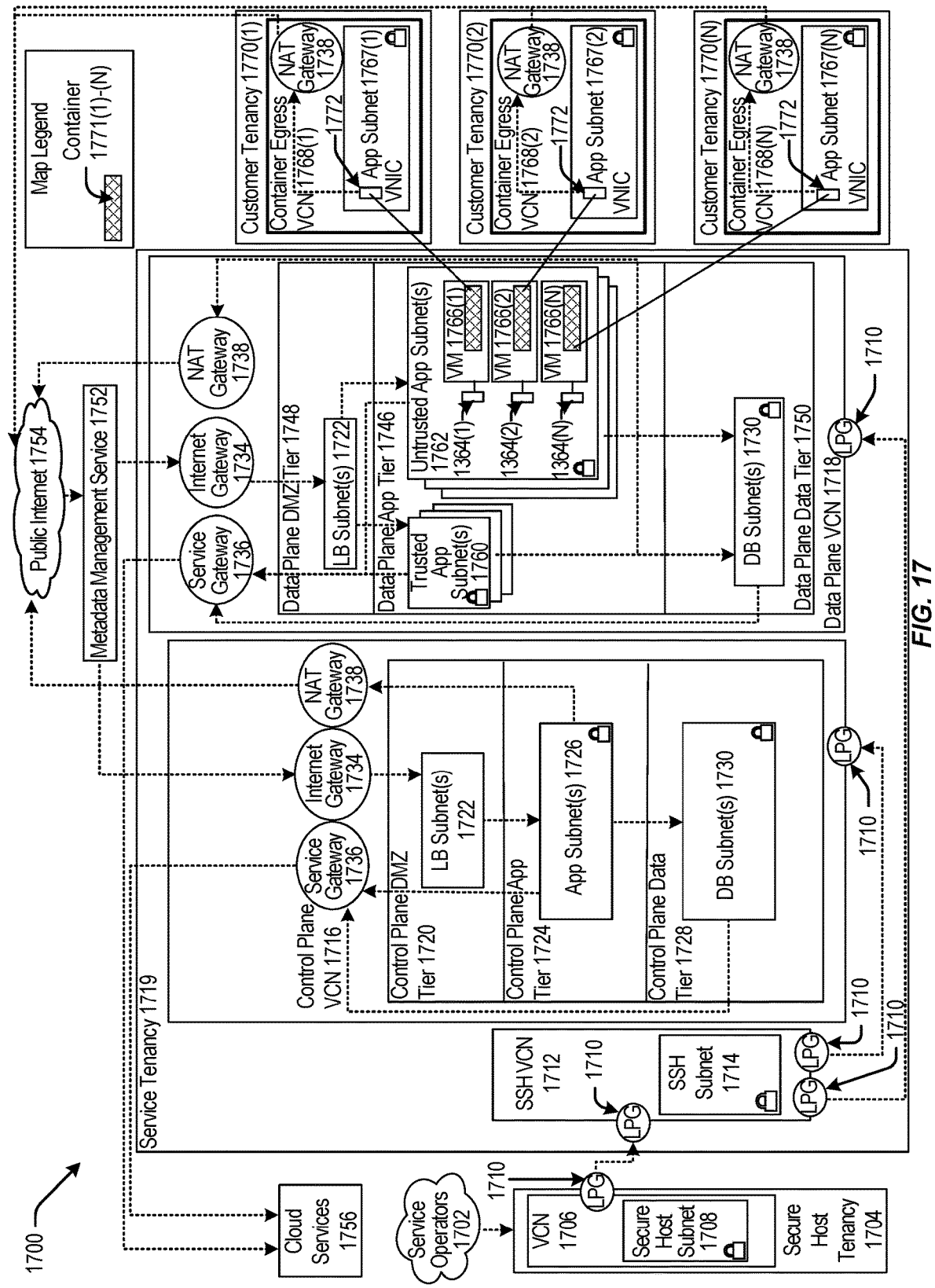
FIG. 17 is a block diagram illustrating another pattern for implementing a cloud infrastructure as a service system, according to at least one embodiment.

FIG. 17 is a block diagram 1700 illustrating another example pattern of an IaaS architecture, according to at least one embodiment. Service operators 1702 (e.g. service operators 1502 of FIG. 15) can be communicatively coupled to a secure host tenancy 1704 (e.g. the secure host tenancy 1504 of FIG. 15) that can include a virtual cloud network (VCN) 1706 (e.g. the VCN 1506 of FIG. 15) and a secure host subnet 1708 (e.g. the secure host subnet 1508 of FIG. 15). The VCN 1706 can include an LPG 1710 (e.g. the LPG 1510 of FIG. 15) that can be communicatively coupled to an SSH VCN 1712 (e.g. the SSH VCN 1512 of FIG. 15) via an LPG 1710 contained in the SSH VCN 1712. The SSH VCN 1712 can include an SSH subnet 1714 (e.g. the SSH subnet 1514 of FIG. 15), and the SSH VCN 1712 can be communicatively coupled to a control plane VCN 1716 (e.g. the control plane VCN 1516 of FIG. 15) via an LPG 1710 contained in the control plane VCN 1716 and to a data plane VCN 1718 (e.g. the data plane 1518 of FIG. 15) via an LPG 1710 contained in the data plane VCN 1718. The control plane VCN 1716 and the data plane VCN 1718 can be contained in a service tenancy 1719 (e.g. the service tenancy 1519 of FIG. 15).

The control plane VCN 1716 can include a control plane DMZ tier 1720 (e.g. the control plane DMZ tier 1520 of FIG. 15) that can include load balancer (LB) subnet(s) 1722 (e.g. LB subnet(s) 1522 of FIG. 15), a control plane app tier 1724 (e.g. the control plane app tier 1524 of FIG. 15) that can include app subnet(s) 1726 (e.g. similar to app subnet(s) 1526 of FIG. 15), a control plane data tier 1728 (e.g. the control plane data tier 1528 of FIG. 15) that can include DB subnet(s) 1730. The LB subnet(s) 1722 contained in the control plane DMZ tier 1720 can be communicatively coupled to the app subnet(s) 1726 contained in the control plane app tier 1724 and to an Internet gateway 1734 (e.g. the Internet gateway 1534 of FIG. 15) that can be contained in the control plane VCN 1716, and the app subnet(s) 1726 can be communicatively coupled to the DB subnet(s) 1730 contained in the control plane data tier 1728 and to a service gateway 1736 (e.g. the service gateway of FIG. 15) and a network address translation (NAT) gateway 1738 (e.g. the NAT gateway 1538 of FIG. 15). The control plane VCN 1716 can include the service gateway 1736 and the NAT gateway 1738.

The data plane VCN 1718 can include a data plane app tier 1746 (e.g. the data plane app tier 1546 of FIG. 15), a data plane DMZ tier 1748 (e.g. the data plane DMZ tier 1548 of FIG. 15), and a data plane data tier 1750 (e.g. the data plane data tier 1550 of FIG. 15). The data plane DMZ tier 1748 can include LB subnet(s) 1722 that can be communicatively coupled to trusted app subnet(s) 1760 and untrusted app subnet(s) 1762 of the data plane app tier 1746 and the Internet gateway 1734 contained in the data plane VCN 1718. The trusted app subnet(s) 1760 can be communicatively coupled to the service gateway 1736 contained in the data plane VCN 1718, the NAT gateway 1738 contained in the data plane VCN 1718, and DB subnet(s) 1730 contained in the data plane data tier 1750. The untrusted app subnet(s) 1762 can be communicatively coupled to the service gateway 1736 contained in the data plane VCN 1718 and DB subnet(s) 1730 contained in the data plane data tier 1750. The data plane data tier 1750 can include DB subnet(s) 1730 that can be communicatively coupled to the service gateway 1736 contained in the data plane VCN 1718.

The untrusted app subnet(s) 1762 can include one or more primary VNICs 1764(1)-(N) that can be communicatively coupled to tenant virtual machines (VMs) 1766(1)-(N). Each tenant VM 1766(1)-(N) can be communicatively coupled to a respective app subnet 1767(1)-(N) that can be contained in respective container egress VCNs 1768(1)-(N) that can be contained in respective customer tenancies 1770(1)-(N). Respective secondary VNICs 1772(1)-(N) can facilitate communication between the untrusted app subnet(s) 1762 contained in the data plane VCN 1718 and the app subnet contained in the container egress VCNs 1768(1)-(N). Each container egress VCNs 1768(1)-(N) can include a NAT gateway 1738 that can be communicatively coupled to public Internet 1754 (e.g. public Internet 1554 of FIG. 15).

The Internet gateway 1734 contained in the control plane VCN 1716 and contained in the data plane VCN 1718 can be communicatively coupled to a metadata management service 1752 (e.g. the metadata management system 1552 of FIG. 15) that can be communicatively coupled to public Internet 1754. Public Internet 1754 can be communicatively coupled to the NAT gateway 1738 contained in the control plane VCN 1716 and contained in the data plane VCN 1718. The service gateway 1736 contained in the control plane VCN 1716 and contained in the data plane VCN 1718 can be communicatively couple to cloud services 1756.

In some embodiments, the data plane VCN 1718 can be integrated with customer tenancies 1770. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1746. Code to run the function may be executed in the VMs 1766(1)-(N), and the code may not be configured to run anywhere else on the data plane VCN 1718. Each VM 1766(1)-(N) may be connected to one customer tenancy 1770. Respective containers 1771(1)-(N) contained in the VMs 1766(1)-(N) may be configured to run the code. In this case, there can be a dual isolation (e.g., the containers 1771(1)-(N) running code, where the containers 1771(1)-(N) may be contained in at least the VM 1766(1)-(N) that are contained in the untrusted app subnet(s) 1762), which may help prevent incorrect or otherwise undesirable code from damaging the network of the IaaS provider or from damaging a network of a different customer. The containers 1771(1)-(N) may be communicatively coupled to the customer tenancy 1770 and may be configured to transmit or receive data from the customer tenancy 1770. The containers 1771(1)-(N) may not be configured to transmit or receive data from any other entity in the data plane VCN 1718. Upon completion of running the code, the IaaS provider may kill or otherwise dispose of the containers 1771(1)-(N).

In some embodiments, the trusted app subnet(s) 1760 may run code that may be owned or operated by the IaaS provider. In this embodiment, the trusted app subnet(s) 1760 may be communicatively coupled to the DB subnet(s) 1730 and be configured to execute CRUD operations in the DB subnet(s) 1730. The untrusted app subnet(s) 1762 may be communicatively coupled to the DB subnet(s) 1730, but in this embodiment, the untrusted app subnet(s) may be configured to execute read operations in the DB subnet(s) 1730. The containers 1771(1)-(N) that can be contained in the VM 1766(1)-(N) of each customer and that may run code from the customer may not be communicatively coupled with the DB subnet(s) 1730.

In other embodiments, the control plane VCN 1716 and the data plane VCN 1718 may not be directly communicatively coupled. In this embodiment, there may be no direct communication between the control plane VCN 1716 and the data plane VCN 1718. However, communication can occur indirectly through at least one method. An LPG 1710 may be established by the IaaS provider that can facilitate communication between the control plane VCN 1716 and the data plane VCN 1718. In another example, the control plane VCN 1716 or the data plane VCN 1718 can make a call to cloud services 1756 via the service gateway 1736. For example, a call to cloud services 1756 from the control plane VCN 1716 can include a request for a service that can communicate with the data plane VCN 1718.

Figure 18:
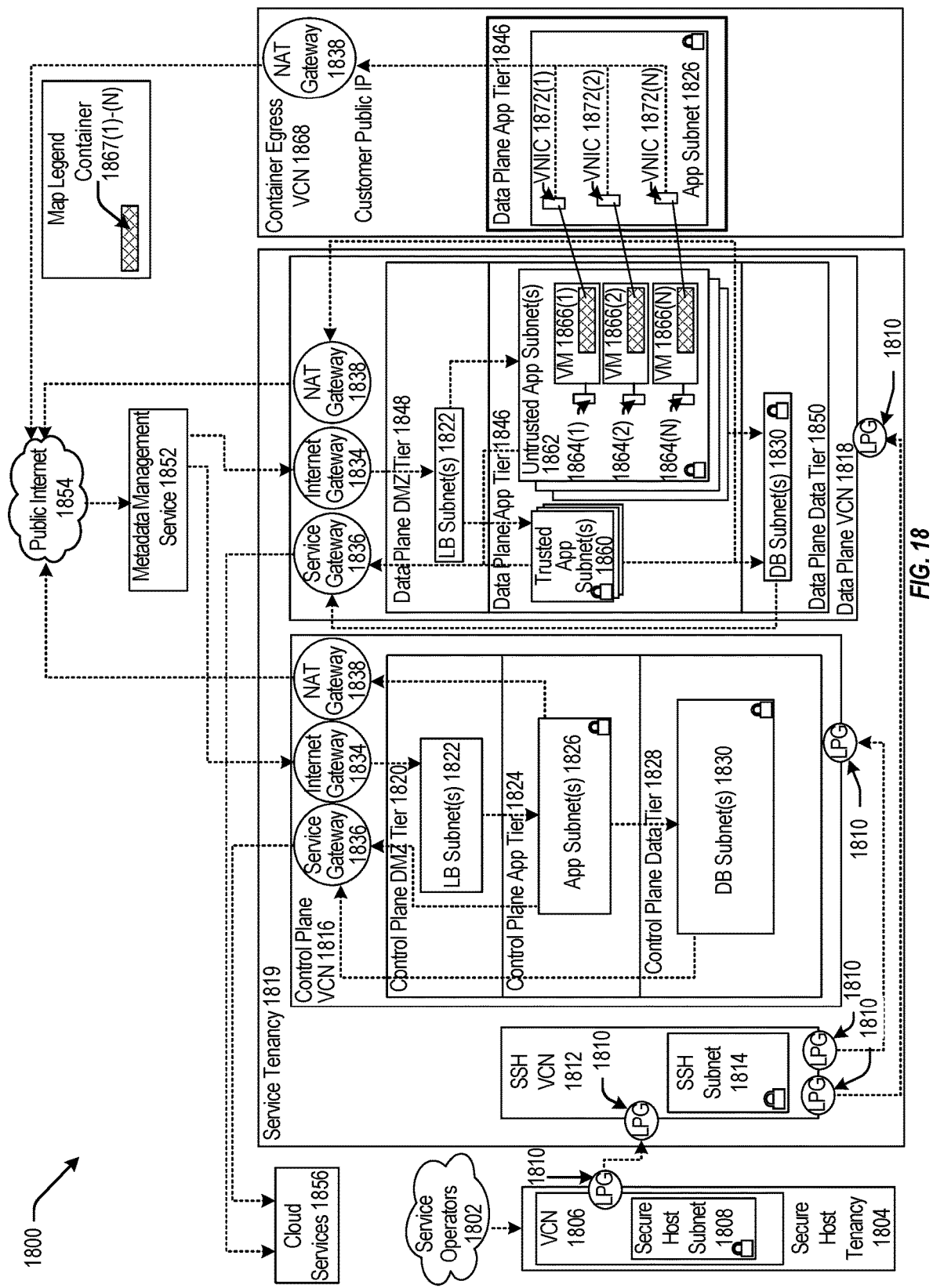
FIG. 18 is a block diagram illustrating another pattern for implementing a cloud infrastructure as a service system, according to at least one embodiment.

FIG. 18 is a block diagram 1800 illustrating another example pattern of an IaaS architecture, according to at least one embodiment. Service operators 1802 (e.g. service operators 1502 of FIG. 15) can be communicatively coupled to a secure host tenancy 1804 (e.g. the secure host tenancy 1504 of FIG. 15) that can include a virtual cloud network (VCN) 1806 (e.g. the VCN 1506 of FIG. 15) and a secure host subnet 1808 (e.g. the secure host subnet 1508 of FIG. 15). The VCN 1806 can include an LPG 1810 (e.g. the LPG 1510 of FIG. 15) that can be communicatively coupled to an SSH VCN 1812 (e.g. the SSH VCN 1512 of FIG. 15) via an LPG 1810 contained in the SSH VCN 1812. The SSH VCN 1812 can include an SSH subnet 1814 (e.g. the SSH subnet 1514 of FIG. 15), and the SSH VCN 1812 can be communicatively coupled to a control plane VCN 1816 (e.g. the control plane VCN 1516 of FIG. 15) via an LPG 1810 contained in the control plane VCN 1816 and to a data plane VCN 1818 (e.g. the data plane 1518 of FIG. 15) via an LPG 1810 contained in the data plane VCN 1818. The control plane VCN 1816 and the data plane VCN 1818 can be contained in a service tenancy 1819 (e.g. the service tenancy 1519 of FIG. 15).

The control plane VCN 1816 can include a control plane DMZ tier 1820 (e.g. the control plane DMZ tier 1520 of FIG. 15) that can include LB subnet(s) 1822 (e.g. LB subnet(s) 1522 of FIG. 15), a control plane app tier 1824 (e.g. the control plane app tier 1524 of FIG. 15) that can include app subnet(s) 1826 (e.g. app subnet(s) 1526 of FIG. 15), a control plane data tier 1828 (e.g. the control plane data tier 1528 of FIG. 15) that can include DB subnet(s) 1830 (e.g. DB subnet(s) 1730 of FIG. 17). The LB subnet(s) 1822 contained in the control plane DMZ tier 1820 can be communicatively coupled to the app subnet(s) 1826 contained in the control plane app tier 1824 and to an Internet gateway 1834 (e.g. the Internet gateway 1534 of FIG. 15) that can be contained in the control plane VCN 1816, and the app subnet(s) 1826 can be communicatively coupled to the DB subnet(s) 1830 contained in the control plane data tier 1828 and to a service gateway 1836 (e.g. the service gateway of FIG. 15) and a network address translation (NAT) gateway 1838 (e.g. the NAT gateway 1538 of FIG. 15). The control plane VCN 1816 can include the service gateway 1836 and the NAT gateway 1838.

The data plane VCN 1818 can include a data plane app tier 1846 (e.g. the data plane app tier 1546 of FIG. 15), a data plane DMZ tier 1848 (e.g. the data plane DMZ tier 1548 of FIG. 15), and a data plane data tier 1850 (e.g. the data plane data tier 1550 of FIG. 15). The data plane DMZ tier 1848 can include LB subnet(s) 1822 that can be communicatively coupled to trusted app subnet(s) 1860 (e.g. trusted app subnet(s) 1760 of FIG. 17) and untrusted app subnet(s) 1862 (e.g. untrusted app subnet(s) 1762 of FIG. 17) of the data plane app tier 1846 and the Internet gateway 1834 contained in the data plane VCN 1818. The trusted app subnet(s) 1860 can be communicatively coupled to the service gateway 1836 contained in the data plane VCN 1818, the NAT gateway 1838 contained in the data plane VCN 1818, and DB subnet(s) 1830 contained in the data plane data tier 1850. The untrusted app subnet(s) 1862 can be communicatively coupled to the service gateway 1836 contained in the data plane VCN 1818 and DB subnet(s) 1830 contained in the data plane data tier 1850. The data plane data tier 1850 can include DB subnet(s) 1830 that can be communicatively coupled to the service gateway 1836 contained in the data plane VCN 1818.

The untrusted app subnet(s) 1862 can include primary VNICs 1864(1)-(N) that can be communicatively coupled to tenant virtual machines (VMs) 1866(1)-(N) residing within the untrusted app subnet(s) 1862. Each tenant VM 1866(1)-(N) can run code in a respective container 1867(1)-(N), and be communicatively coupled to an app subnet 1826 that can be contained in a data plane app tier 1846 that can be contained in a container egress VCN 1868. Respective secondary VNICs 1872(1)-(N) can facilitate communication between the untrusted app subnet(s) 1862 contained in the data plane VCN 1818 and the app subnet contained in the container egress VCN 1868. The container egress VCN can include a NAT gateway 1838 that can be communicatively coupled to public Internet 1854 (e.g. public Internet 1554 of FIG. 15).

The Internet gateway 1834 contained in the control plane VCN 1816 and contained in the data plane VCN 1818 can be communicatively coupled to a metadata management service 1852 (e.g. the metadata management system 1552 of FIG. 15) that can be communicatively coupled to public Internet 1854. Public Internet 1854 can be communicatively coupled to the NAT gateway 1838 contained in the control plane VCN 1816 and contained in the data plane VCN 1818. The service gateway 1836 contained in the control plane VCN 1816 and contained in the data plane VCN 1818 can be communicatively couple to cloud services 1856.

In some examples, the pattern illustrated by the architecture of block diagram 1800 of FIG. 18 may be considered an exception to the pattern illustrated by the architecture of block diagram 1700 of FIG. 17 and may be desirable for a customer of the IaaS provider if the IaaS provider cannot directly communicate with the customer (e.g., a disconnected region). The respective containers 1867(1)-(N) that are contained in the VMs 1866(1)-(N) for each customer can be accessed in real-time by the customer. The containers 1867(1)-(N) may be configured to make calls to respective secondary VNICs 1872(1)-(N) contained in app subnet(s) 1826 of the data plane app tier 1846 that can be contained in the container egress VCN 1868. The secondary VNICs 1872(1)-(N) can transmit the calls to the NAT gateway 1838 that may transmit the calls to public Internet 1854. In this example, the containers 1867(1)-(N) that can be accessed in real-time by the customer can be isolated from the control plane VCN 1816 and can be isolated from other entities contained in the data plane VCN 1818. The containers 1867(1)-(N) may also be isolated from resources from other customers.

In other examples, the customer can use the containers 1867(1)-(N) to call cloud services 1856. In this example, the customer may run code in the containers 1867(1)-(N) that requests a service from cloud services 1856. The containers 1867(1)-(N) can transmit this request to the secondary VNICs 1872(1)-(N) that can transmit the request to the NAT gateway that can transmit the request to public Internet 1854. Public Internet 1854 can transmit the request to LB subnet(s) 1822 contained in the control plane VCN 1816 via the Internet gateway 1834. In response to determining the request is valid, the LB subnet(s) can transmit the request to app subnet(s) 1826 that can transmit the request to cloud services 1856 via the service gateway 1836.

It should be appreciated that IaaS architectures 1500, 1600, 1700, 1800 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 19:
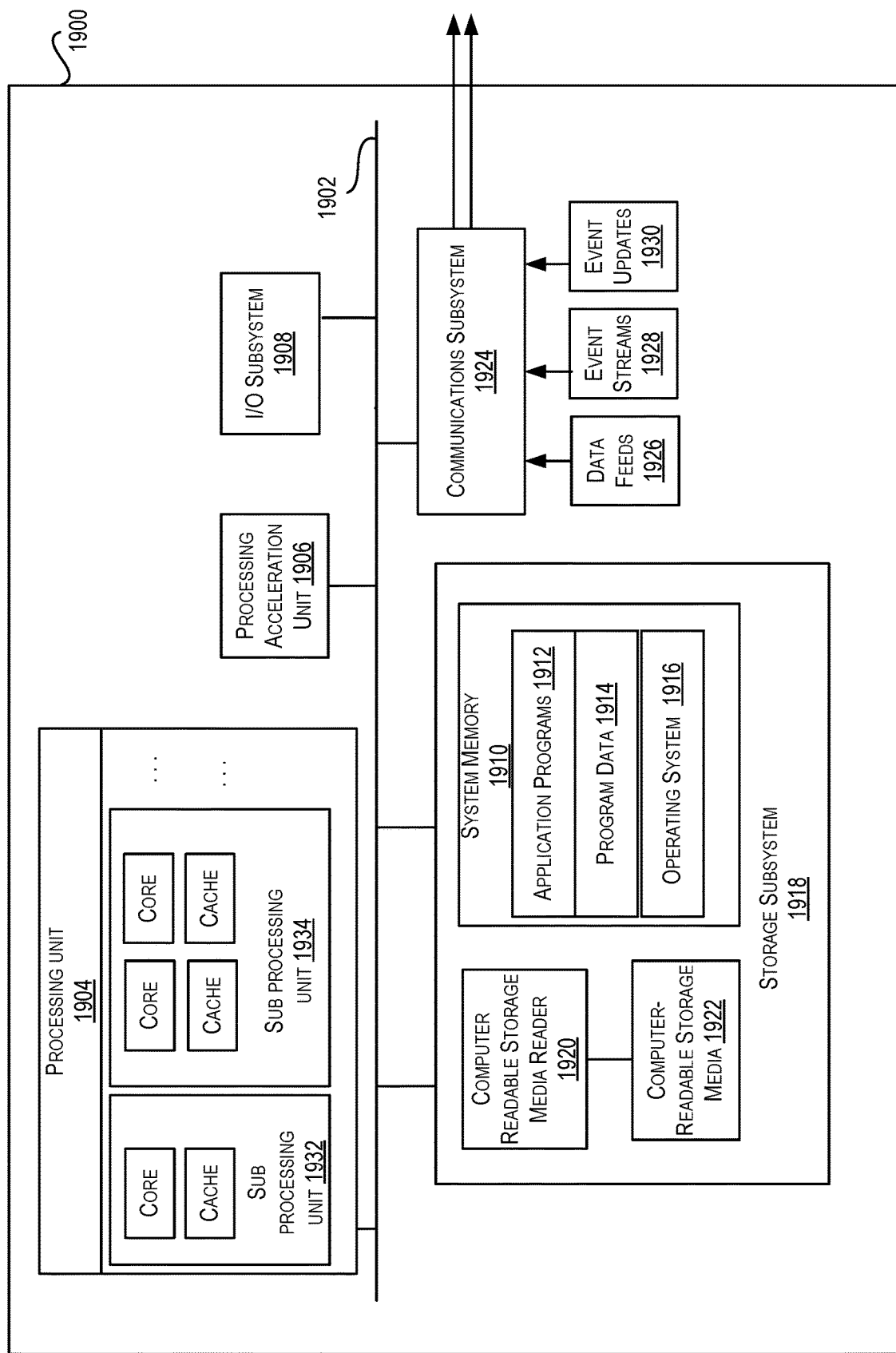
FIG. 19 is a block diagram illustrating an example computer system, according to at least one embodiment.

FIG. 19 illustrates an example computer system 1900, in which various embodiments of the present disclosure may be implemented. The system 1900 may be used to implement any of the computer systems described above. As shown in the figure, computer system 1900 includes a processing unit 1904 that communicates with a number of peripheral subsystems via a bus subsystem 1902. These peripheral subsystems may include a processing acceleration unit 1906, an I/O subsystem 1908, a storage subsystem 1918 and a communications subsystem 1924. Storage subsystem 1918 includes tangible computer-readable storage media 1922 and a system memory 1910.

Bus subsystem 1902 provides a mechanism for letting the various components and subsystems of computer system 1900 communicate with each other as intended. Although bus subsystem 1902 is shown schematically as a single bus, alternative embodiments of the bus subsystem may utilize multiple buses. Bus subsystem 1902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1904, which can be implemented as one or more integrated circuits (e.g., a conventional microprocessor or microcontroller), controls the operation of computer system 1900. One or more processors may be included in processing unit 1904. These processors may include single core or multicore processors. In certain embodiments, processing unit 1904 may be implemented as one or more independent processing units 1932 and/or 1934 with single or multicore processors included in each processing unit. In other embodiments, processing unit 1904 may also be implemented as a quad-core processing unit formed by integrating two dual-core processors into a single chip.

In various embodiments, processing unit 1904 can execute a variety of programs in response to program code and can maintain multiple concurrently executing programs or processes. At any given time, some or all of the program code to be executed can be resident in processor(s) 1904 and/or in storage subsystem 1918. Through suitable programming, processor(s) 1904 can provide various functionalities described above. Computer system 1900 may additionally include a processing acceleration unit 1906, which can include a digital signal processor (DSP), a special-purpose processor, and/or the like.

I/O subsystem 1908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1900 may comprise a storage subsystem 1918 that comprises software elements, shown as being currently located within a system memory 1910. System memory 1910 may store program instructions that are loadable and executable on processing unit 1904, as well as data generated during the execution of these programs.

Depending on the configuration and type of computer system 1900, system memory 1910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1904. In some implementations, system memory 1910 may include multiple different types of memory, such as static random access memory (SRAM) or dynamic random access memory (DRAM). In some implementations, a basic input/output system (BIOS), containing the basic routines that help to transfer information between elements within computer system 1900, such as during start-up, may typically be stored in the ROM. By way of example, and not limitation, system memory 1910 also illustrates application programs 1912, which may include client applications, Web browsers, mid-tier applications, relational database management systems (RDBMS), etc., program data 1914, and an operating system 1916. By way of example, operating system 1916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 19 OS, and Palm® OS operating systems.

Storage subsystem 1918 may also provide a tangible computer-readable storage medium for storing the basic programming and data constructs that provide the functionality of some embodiments. Software (programs, code modules, instructions) that when executed by a processor provide the functionality described above may be stored in storage subsystem 1918. These software modules or instructions may be executed by processing unit 1904. Storage subsystem 1918 may also provide a repository for storing data used in accordance with the present disclosure.

Storage subsystem 1900 may also include a computer-readable storage media reader 1920 that can further be connected to computer-readable storage media 1922. Together and, optionally, in combination with system memory 1910, computer-readable storage media 1922 may comprehensively represent remote, local, fixed, and/or removable storage devices plus storage media for temporarily and/or more permanently containing, storing, transmitting, and retrieving computer-readable information.

Computer-readable storage media 1922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1900.

By way of example, computer-readable storage media 1922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1922 may include, but is not limited to, Zip® drives, flash memory cards, universal serial bus (USB) flash drives, secure digital (SD) cards, DVD disks, digital video tape, and the like. Computer-readable storage media 1922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1900.

Communications subsystem 1924 provides an interface to other computer systems and networks. Communications subsystem 1924 serves as an interface for receiving data from and transmitting data to other systems from computer system 1900. For example, communications subsystem 1924 may enable computer system 1900 to connect to one or more devices via the Internet. In some embodiments communications subsystem 1924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1924 can provide wired network connectivity (e.g., Ethernet) in addition to or instead of a wireless interface.

In some embodiments, communications subsystem 1924 may also receive input communication in the form of structured and/or unstructured data feeds 1926, event streams 1928, event updates 1930, and the like on behalf of one or more users who may use computer system 1900.

By way of example, communications subsystem 1924 may be configured to receive data feeds 1926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1924 may also be configured to receive data in the form of continuous data streams, which may include event streams 1928 of real-time events and/or event updates 1930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1924 may also be configured to output the structured and/or unstructured data feeds 1926, event streams 1928, event updates 1930, and the like to one or more databases that may be in communication with one or more streaming data source computers coupled to computer system 1900.

Computer system 1900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving a resource configuration of a first resource;
   identifying, from the resource configuration of the first resource, a dependency of a first stage of the first resource on a second resource;
   performing a topological sort of a plurality of resources comprising the first resource and the second resource, based at least in part on the dependency of the first stage of the first resource;
   constructing a dependency graph comprising the plurality of resources, the dependency graph comprising the first stage of the first resource in a subordinate rank and the second resource in a superior rank, corresponding to the topological sort;
   generating, in accordance with the dependency graph, an execution queue comprising the second resource in a priority execution position in the execution queue relative to the first stage of the first resource; and
   executing the plurality of resources according to the execution queue.

2. The method of claim 1, wherein constructing the dependency graph comprises:

identifying a redundant dependency in the dependency graph; and
removing the redundant dependency from the dependency graph.

3. The method of claim 1, wherein the resource configuration of the first resource comprises a declarative identification of one or more resources upon which the first stage of the first resource depends, and wherein identifying the dependency of the first stage of the first resource comprises identifying the declarative identification.

4. The method of claim 1, further comprising:
receiving an event notification indicating the second resource has changed;
traversing the dependency graph to identify one or more stages depending on the second resource including the first stage; and
adding the first stage to the execution queue according to the dependency graph.

5. The method of claim 1, further comprising:
receiving an error notification describing an error in execution of the second resource;
traversing the dependency graph to identify a dependent stage depending on the second resource;
identifying the first stage as the dependent stage; and
modifying a resource status of the first stage to an error status.

6. The method of claim 1, further comprising initializing the first resource and the second resource, in accordance with the topological sort.

7. The method of claim 1, wherein the plurality of resources are included in a single environment.

8. A computer system, comprising:
one or more processors;
a memory in communication with the one or more processors, the memory configured to store computer-executable instructions, wherein executing the computer-executable instructions causes the one or more processors to perform steps comprising:
receiving a resource configuration of a first resource;
identifying, from the resource configuration of the first resource, a dependency of a first stage of the first resource on a second resource;
performing a topological sort of a plurality of resources comprising the first resource and the second resource, based at least in part on the dependency of the first stage of the first resource;
constructing a dependency graph comprising the plurality of resources, the dependency graph comprising the first stage of the first resource in a subordinate rank and the second resource in a superior rank, corresponding to the topological sort;
generating, in accordance with the dependency graph, an execution queue comprising the second resource in a priority execution position in the execution queue relative to the first stage of the first resource; and
executing the plurality of resources according to the execution queue.

9. The system of claim 8, wherein constructing the dependency graph comprises:
identifying a redundant dependency in the dependency graph; and
removing the redundant dependency from the dependency graph.

10. The system of claim 8, wherein the resource configuration of the first resource comprises a declarative identification of one or more resources upon which the first stage of the first resource depends, and wherein identifying the dependency of the first stage of the first resource comprises identifying the declarative identification.

11. The system of claim 8, wherein executing the computer-executable instructions further causes the one or more processors to perform steps comprising:
receiving an event notification indicating the second resource has changed;
traversing the dependency graph to identify one or more stages depending on the second resource including the first stage; and
adding the first stage to the execution queue according to the dependency graph.

12. The system of claim 8, wherein executing the computer-executable instructions further causes the one or more processors to perform steps comprising:
receiving an error notification describing an error in execution of the second resource;
traversing the dependency graph to identify a dependent stage depending on the second resource;
identifying the first stage as the dependent stage; and
modifying a resource status of the first stage to an error status.

13. The system of claim 8, wherein executing the computer-executable instructions further causes the one or more processors to perform steps comprising:
initializing the first resource and the second resource, in accordance with the topological sort.

14. The system of claim 8, wherein the plurality of resources are included in a single environment.

15. A computer-readable storage medium, storing computer-executable instructions that, when executed, cause one or more processors of a computer system to perform steps comprising:
receiving a resource configuration of a first resource;
identifying, from the resource configuration of the first resource, a dependency of a first stage of the first resource on a second resource;
performing a topological sort of a plurality of resources comprising the first resource and the second resource, based at least in part on the dependency of the first stage of the first resource;
constructing a dependency graph comprising the plurality of resources, the dependency graph comprising the first stage of the first resource in a subordinate rank and the second resource in a superior rank, corresponding to the topological sort;
generating, in accordance with the dependency graph, an execution queue comprising the second resource in a priority execution position in the execution queue relative to the first stage of the first resource; and
executing the plurality of resources according to the execution queue.

16. The computer-readable storage medium of claim 15, wherein constructing the dependency graph comprises:
identifying a redundant dependency in the dependency graph; and
removing the redundant dependency from the dependency graph.

17. The computer-readable storage medium of claim 15, wherein the resource configuration of the first resource comprises a declarative identification of one or more resources upon which the first stage of the first resource depends, and wherein identifying the dependency of the first stage of the first resource comprises identifying the declarative identification.

18. The computer-readable storage medium of claim 15, wherein executing the computer-executable instructions further causes the one or more processors to perform steps comprising:
- receiving an event notification indicating the second resource has changed;
- traversing the dependency graph to identify one or more stages depending on the second resource including the first stage; and
- adding the first stage to the execution queue according to the dependency graph.

19. The computer-readable storage medium of claim 15, wherein executing the computer-executable instructions further causes the one or more processors to perform steps comprising:
- receiving an error notification describing an error in execution of the second resource;
- traversing the dependency graph to identify a dependent stage depending on the second resource;
- identifying the first stage as the dependent stage; and
- modifying a resource status of the first stage to an error status.

20. The computer-readable storage medium of claim 15, wherein executing the computer-executable instructions further causes the one or more processors to perform steps comprising:
- initializing the first resource and the second resource, in accordance with the topological sort.

* * * * *